(12) United States Patent  (10) Patent No.: US 7,051,004 B2
Nuttall et al.  (45) Date of Patent: May 23, 2006

(54) SYSTEM AND METHODS PROVIDING SECURE DELIVERY OF LICENSES AND CONTENT

(75) Inventors: Francois-Xavier Nuttall, Prevessin (FR); David Charles Collier, Gilroy, CA (US); Robert J. Fenney, Studio City, CA (US); Patrice J. Capitant, Los Altos, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 10/041,906

(22) Filed: Oct. 18, 2001

(65) Prior Publication Data

US 2003/0004895 A1  Jan. 2, 2003

Related U.S. Application Data

(60) Continuation-in-part of application No. 09/717,614, filed on Nov. 21, 2000, now Pat. No. 6,889,206, which is a division of application No. 09/055,068, filed on Apr. 3, 1998, now Pat. No. 6,202,056.

(51) Int. Cl.
*G06F 17/60* (2006.01)

(52) U.S. Cl. ............... 705/51; 365/49; 365/189.07; 365/154; 365/190; 707/10; 707/104.1; 707/1; 707/100; 707/102; 707/101; 707/3; 709/223

(58) Field of Classification Search ............ 705/51–59; 707/10, 104.1, 1, 100, 102, 101, 3; 365/49, 365/189.07, 154, 190; 709/223
See application file for complete search history.

(56) References Cited

U.S. PATENT DOCUMENTS

| 4,658,093 | A |   | 4/1987  | Hellman        |        |
|-----------|---|---|---------|----------------|--------|
| 4,727,243 | A | * | 2/1988  | Savar          | 705/17 |
| 5,050,213 | A |   | 9/1991  | Shear          |        |
| 5,138,712 | A |   | 8/1992  | Corbin         |        |
| 5,291,596 | A |   | 3/1994  | Mita           |        |
| 5,337,357 | A |   | 8/1994  | Chou et al.    |        |
| 5,455,953 | A |   | 10/1995 | Russell        |        |
| 5,563,946 | A |   | 10/1996 | Cooper et al.  |        |
| 5,592,511 | A |   | 1/1997  | Schoen et al.  |        |
| 5,634,012 | A |   | 5/1997  | Stefik et al.  |        |
| 5,715,403 | A | * | 2/1998  | Stefik         | 705/44 |
| 5,737,414 | A |   | 4/1998  | Walker et al.  |        |

(Continued)

FOREIGN PATENT DOCUMENTS

JP    H03-282733    *    3/1990

(Continued)

OTHER PUBLICATIONS

Schuba, Christoph L. and Eugene H. Spafford. A Reference Model for Firewall Technology. COAST Laboratory Department of Computer Sciences Purdue University. 1997.*

(Continued)

*Primary Examiner*—James A Reagan
(74) *Attorney, Agent, or Firm*—Orrick, Herrington & Sutcliffe LLP

(57) ABSTRACT

A computer network having a requesting node and a providing node permits data transfer therebetween when permitted by an authorizing node. Reports generated in response to authorizations and reports generated in response to data transfers are reconciled at a reconciliation node to improve the accuracy of payments collected and paid for use of the data. Such payments include copyright royalties for audio, video, and other works recorded in digital format.

32 Claims, 31 Drawing Sheets

U.S. PATENT DOCUMENTS

| | | | |
|---|---|---|---|
| 5,758,068 A | 5/1998 | Brandt et al. | |
| 5,765,152 A | 6/1998 | Erickson | |
| 5,790,423 A | 8/1998 | Lau et al. | |
| 5,870,562 A | 2/1999 | Butman et al. | |
| 5,892,900 A | 4/1999 | Ginter et al. | |
| 5,907,617 A | 5/1999 | Ronning | |
| 5,930,768 A | 7/1999 | Hooban | |
| 5,937,164 A | 8/1999 | Mages et al. | |
| 6,088,455 A | 7/2000 | Logan et al. | |
| 6,112,304 A * | 8/2000 | Clawson | 713/156 |
| 6,201,771 B1 | 3/2001 | Otsuka et al. | |
| 6,232,539 B1 | 5/2001 | Looney et al. | |
| 6,236,971 B1 | 5/2001 | Stefik et al. | |
| 6,249,865 B1 | 6/2001 | Walker et al. | |
| 6,253,069 B1 | 6/2001 | Mankovitz | |
| 6,253,193 B1 | 6/2001 | Ginter et al. | |

FOREIGN PATENT DOCUMENTS

| | | |
|---|---|---|
| WO | WO98/09209 | 5/1998 |
| WO | WO98/10381 | 12/1998 |

OTHER PUBLICATIONS

Bernstein et al., "Copyrights, Distribution Chains, Integrity and Piracy: The Need for a Standards based Solution", Proceedings of the Knowright Conference, Proceedings of the International Congress on Intellectual Property Rights for Specialized Information, Knowledge and New Technology, p. 344, p. 350.

Christoph L. Schuba, and Eugene H. Spafford, "A Reference Model for Firewall Technology," Department of Computer Sciences. Purdue University, West Lafavette. IN. 1997.

* cited by examiner

|  Report  |  |  |  |  | Reconciliation Result |
|---|---|---|---|---|---|
| A | B | C | D | E |  |
| Y | Y | Y | Y | Y | Normal request/payment |
| Y | Y | N | N | X | Failed CRN |
| N | N | Y | X | X | Failed CRN |
| N | N | X | Y | X | Failed CRN |

Y = Yes
N = No
X = Don't Care

FIG. 5

| CONTENT FILE HEADER | 1400 |
|---|---|

| content.version |
|---|
| content.title |
| content.crtist |
| content.copyright |
| content.date.recording |
| content.size |
| content.listen.begin |
| content.listen.duration |
| content.ID.code.type |
| content.ID.code.number |
| content.watermark.tech |
| content.legal.duration |
| content.file.number |
| content.usage.counter |
| content.CPN.node.address |
| content.generation.number |
| content.date.start.validity |
| content.date.stop.validity |
| content.encrypt.tech |
| content.encrypt.key |
| content.listen.price |
| content.listen.currency |
| content.copy.price |
| content.copy.currency |
| content.home.copy.price |
| content.home.copy.currency |

FIG. 14

| REQUEST |
|---|
| request.map.pathname |
| request.access.mode |
| request.sound.quality |
| request.content.price |
| request.content.currency |
| request.CRN.node.address |
| request.CRN.username |
| request.CRN.password |
| request.CPN.node.address |
| request.CPN.product.name |
| request.CPN.product.number |
| request.CRN.node.address.transaction.number |

| PERMIT |
|---|
| map.content.version |
| map.CPN.node.address.pathname.quality.level 1 |
| map.CPN.node.address.pathname.quality.level 2 |
| map.CPN.node.address.pathname.quality.level 3 |
| . . . |
| map.node.address.pathname.quality.level N |
| request.content.price |
| request.content.currency |
| permit.CPN.node.address |
| permit.AN.date.time |

| START REPORT |
|---|
| request.CRN.node.address.transaction.number |
| request.CRN.node.address |
| request.CRN.username |
| request.CRN.password |
| request.access.mode |
| start.report.date.time |
| content.title |
| content.artist |
| content.copyright |
| content.legal.duration |
| content.ID.code.type |
| content.ID.code.number |
| content.CPN.node.address |
| content.file.number |
| start.report.CRN.encrypt.key |
| request.content.price |
| request.content.currency |
| request.sound.quality |
| permit.map.CPN.node.address.pathname.quality.level[x] |
| start.report.CRN.timezone |
| start.report.CRN.language |
| start.report.CRN.keyboard |

| SUMMARY REPORT |
|---|
| request.CRN.node.address.transaction.number |
| request.CRN.node.address |
| request.CRN.username |
| request.CRN.password |
| content.ID.code.type |
| content.ID.code.number |

| ACCESS REPORT |
|---|
| content.title |
| content.artist |
| content.copyright |
| content.legal.duration |
| content.ID.code.type |
| content.ID.code.number |
| content.CPN.node.address |
| content.file.number |
| access.territory.rightowners |
| content.price |
| content.currency |
| request.CRN.node.address.transaction.number |

FIG. 19

| DEBIT REPORT |
|---|
| content.ID.code.type |
| content.ID.code.number |
| content.CPN.node.address |
| request.CPN.product.name |
| request.CPN.product.number |
| debit.date.time |
| request.CRN.username |
| request.CRN.password |
| request.content.price |
| request.content.currency |
| request.CRN.node.address.transaction.number |

| REQUEST1 FOR PERMIT (2581) |
|---|
| request1.consumer.transaction.id |
| request1.consumer.node.address |
| request1.consumer.host.id |
| request1.consumer.public.key |
| request1.product.identifier |
| request1.product.price |
| request1.product.currency |
| request1.product.delivery.mode |
| request1.product.delivery.date.time |

FIG. 26A

| REQUEST2 FOR PERMIT (2532) |
|---|
| request1.consumer.transaction.id |
| request1.consumer.node.address |
| request1.consumer.host.id |
| request1.consumer.public.key |
| request1.product.identifier |
| request1.product.delivery.mode |
| request1.product.delivery.date.time |

FIG. 26B

| PERMIT (2525) |
|---|
| permit.version |
| permit.id |
| request1.consumer.transaction.id |
| request1.consumer.node.address |
| request1.consumer.host.id |
| request1.product.identifier |
| permit.product.usage.rights |
| permit.product.key |
| request1.product.delivery.mode |
| request1.product.delivery.date.time |
| permit.seal |

FIG. 26C

| REQUEST3 FOR DELIVERY (2579, 2543) |
|---|
| permit.version |
| permit.id |
| request1.consumer.transaction.id |
| request1.consumer.node.address |
| request1.consumer.host.id |
| request3.consumer.date.time |
| request1.product.identifier |
| permit.product.usage.rights |
| permit.product.key |
| request1.product.delivery.mode |
| request1.product.delivery.date.time |
| permit.seal |

FIG. 26D

| REQUEST4 FOR DELIVERY (2527) |
|---|
| request1.consumer.transaction.id |
| request1.consumer.node.address |
| request1.consumer.host.id |
| request1.product.identifier |
| request1.product.delivery.mode |
| request1.product.delivery.date.time |
| request4.packaging.decryption.key |
| request4.delivery.encryption.key |
| permit.product.key |

FIG. 26E

| HEADER FOR DELIVERY OF PRODUCT (STREAMING OR DOWNLOAD) (2565) |
|---|
| request1.consumer.transaction.id |
| request1.consumer.node.address |
| request1.consumer.host.id |
| request1.product.identifier |
| permit.product.key |

FIG. 26F

| REPORT1 FROM CONSUMER (2580) |
|---|
| request1.consumer.transaction.id |
| request1.consumer.node.address |
| request1.consumer.host.id |
| permit.id |
| request1.product.identifier |
| report1.status.message |

FIG. 26G

| REPORT2 FROM DELIVERER (2564) |
|---|
| request1.consumer.transaction.id |
| request1.consumer.node.address |
| request1.consumer.host.id |
| permit.id |
| request1.product.identifier |
| report2.status.message |

FIG. 26H

| REPORT3 FROM SECURITY MANAGER (2544) |
|---|
| request1.consumer.transaction.id |
| request1.consumer.node.address |
| request1.consumer.host.id |
| permit.id |
| request1.product.identifier |
| report3.status.message |

FIG. 26I

SYSTEM AND METHODS PROVIDING SECURE DELIVERY OF LICENSES AND CONTENT

CROSS-REFERENCE TO RELATED APPLICATIONS

This application is a continuation in part application of and claims priority to application Ser. No. 09/717,614 filed Nov. 21, 2000 now U.S. Pat. No. 6,889,206 by Nuttall, which is a divisional application Ser. No. 09/055,068 filed Apr. 3, 1998 by Nuttall, now U.S. Pat. No. 6,202,056.

FIELD OF THE INVENTION

The present invention relates to computer networks for data transfer and to monitoring use of such data for example for fee accounting for usage rights.

BACKGROUND OF THE INVENTION

Publishers of information in digital form desire to prevent the unauthorized and unaccounted distribution or usage of electronically published materials. Electronically published materials are typically distributed in a digital form and recreated on a computer based system. Audio and video recordings, computer programs, books, and multimedia are examples of works that are suitable for publishing electronically. The sales revenue for companies in the electronic publishing and information systems industries includes payments based on an accounting for delivery of information in digital form, for example the sale of an audio CD at a retail outlet. Any unaccounted distribution of a work results in decreased revenue to the distributor and decreased royalty for the owner of usage rights in the work. For example, being able to copy an audio recording CD to another digital medium from which the audio can be retrieved and played circumvents payment for distribution from which royalty for copyright may have been due to the owner of rights in the work.

Owners of rights in electronically published works also desire to prevent the unauthorized and unaccounted distribution or usage of such materials. When records of the distribution and usage of a work are held exclusively by the distributor, falsification of records results in increased profit for the distributor and loss of royalty income for the owner of rights.

Unauthorized and unaccounted distribution can be curbed by preventing unauthorized copying of the work onto digital storage media and unauthorized transmission of the work over computer networks. Unauthorized and unaccounted usage can be curbed by preventing storage of the work for reuse or by monitoring the use of stored copies.

Existing systems and methods for preventing storage, transmission, and unmonitored use of digital works place a heavy burden of cost on the consumer desiring access to a work in digital form. The continued expansion of publication and use of works in digital form cannot remain within the policies for intellectual property protection (such as providing incentives to authors and publishers) without systems and methods for computer network operation that provide an accurate basis for usage fees.

SUMMARY OF THE INVENTION

A system for the control of distribution and use of digital works includes a distribution and usage reporting mechanism for accurately calculating fees associated with such distribution and use. The system operates according to a method for transferring data from a content providing node to a content requesting node. The method includes the steps of: (a) transmitting a first request to the content providing node, the first request for notifying an authorizing node; (b) receiving a permit from the authorizing node in response to the notification; (c) determining a file name in response to the permit; (d) transmitting to the content providing node a second request comprising the file name; (e) transmitting to an event reporting node a first report in response to receiving the permit; (f) receiving data from the file; and (g) transmitting to the event reporting node a second report in response to receiving the file.

By obtaining the permit without direct communication between the content requesting node and the authorizing node, manipulation of the authorizing node by the content requesting node is prevented. The content requesting node has an incentive to manipulate the authorizing node in order to receive unlimited authorization. The content providing node has an incentive to maintain proper authorization because revenues to the content providing node may be based on the number of authorized transfers.

Although a work may be identified in the request received at the content providing node, the content providing node may be prevented from obtaining information leading to the filenames that comprise the work. The content providing node may have an incentive to provide free transfers of the work for other commercial or personal use; however, by determining the file name in response to the permit and preventing access to the permit from the content providing node, the content providing node cannot identify particular files that correspond to a particular work.

By transmitting reports from the content requesting node to an event reporting node, modification of data transfer reports by the content providing node is prevented. Accurate records provide basis, for example, for fees payable to owners of rights in the work.

By transmitting a first report prior to data transfer and a second report after data transfer, a duration of the usage of the data may be used as a basis, for example, for revenues to distributors and payments to owners of rights. Falsification of the duration of usage by the content requesting node is prevented.

BRIEF DESCRIPTION OF THE DRAWING

Embodiments of the present invention will now be further described with reference to the drawing, wherein like designations denote like elements, and:

FIG. 5 is a table of outcomes for lost transmissions of reports;

FIG. 14 is a memory map of a data structure of a header of a content file of the present invention;

FIG. 15 is a memory map of a data structure of a request of the present invention;

FIG. 16 is a memory map of a data structure of a permit of the present invention;

FIG. 17 is a memory map of a data structure of a start report of the present invention;

FIG. 18 is a memory map of a data structure of a summary report of the present invention;

FIG. 19 is a memory map of a data structure of an access report of the present invention;

FIG. 20 is a memory map of a data structure of a debit report of the present invention;

FIGS. 26A–26I present memory maps of data structures used in the architecture of FIG. 25.

DETAILED DESCRIPTION OF THE PREFERRED EMBODIMENTS

Data transfer in the present invention is illustrated among computer systems using a communication network. A communication network of the present invention includes at least one computer system at each of several network nodes. Each node is coupled by a link from time to time for communication with other nodes of the network. Each link includes conventional computer communication technology of the type including, for example, local area, wide area, dedicated telephone, or satellite services and including conventional data communication hardware and software. The popular computer networks known as the Internet, World Wide Web, and National Information Infrastructure are examples of such a communication network having nodes possibly at physically separate locations and addressed by a node address, for example a uniform resource locator (URL), a name from a domain name system (DNS), or an Internet Protocol address (IP).

Figure 1:
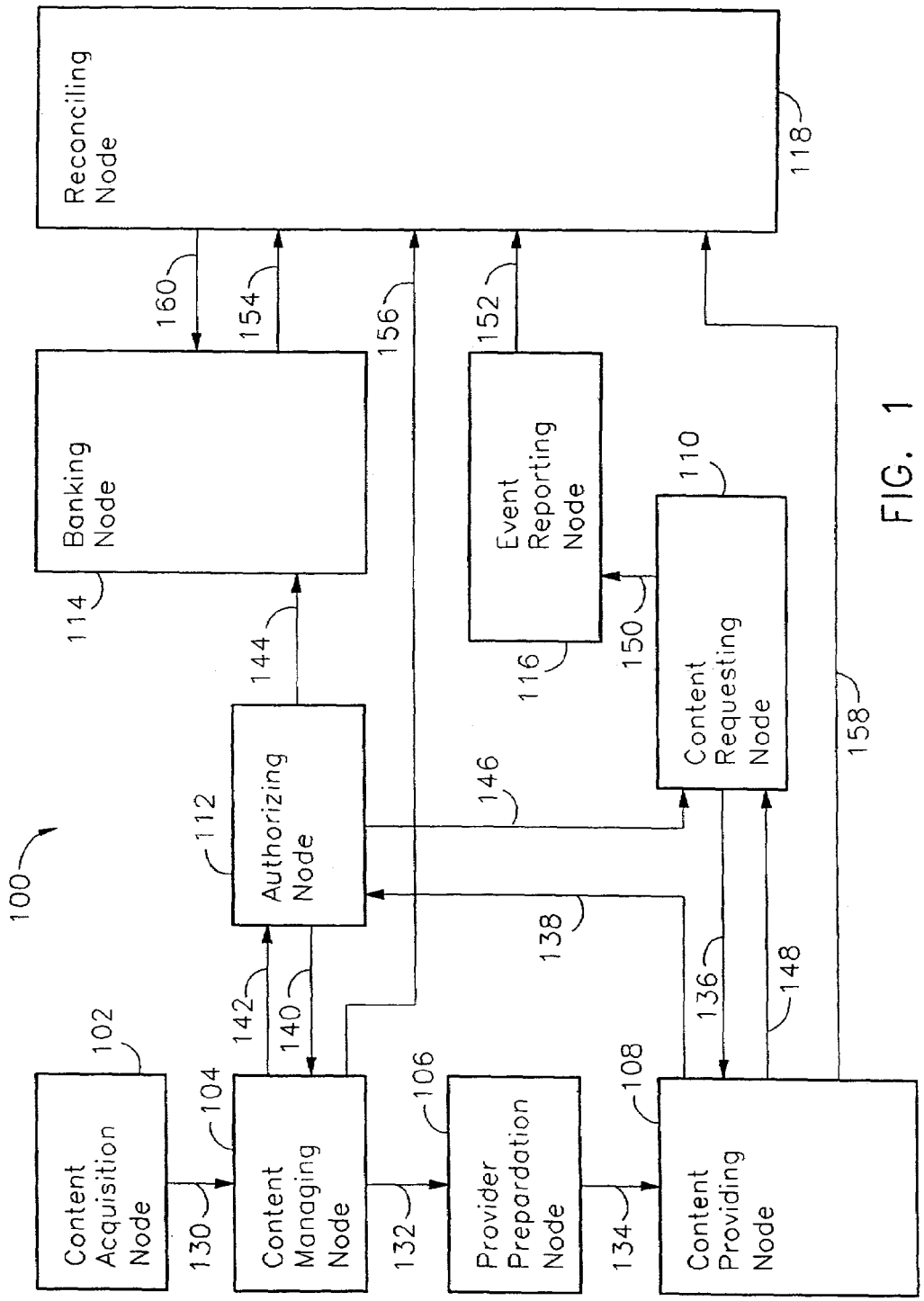
FIG. 1 is a block diagram of a network in one embodiment of the present invention.

Communication network 100 of FIG. 1 includes computer systems, each shown in a block, that communicate for data transfer. Communication of messages is illustrated by one or more lines between blocks, though it is apparent that one communication link between any two blocks is sufficient for any number of message lines. Practice of variations of the invention is independent of whether such a link is maintained continuously, as in a dedicated line, or is maintained for the duration of the message as in some public multiple access facilities.

Communication technology provides known mechanisms and computer software for message transfer. This technology surrounds the message content data with other data that provide a mechanism for various purposes including tracking messages, synchronizing equipment, and assuring accurate and secure transfer of message content data. In the description that follows, digital works are transferred between nodes. The term "content," therefore, refers to a digital work or a portion thereof.

Network 100 includes content acquisition node 102, content managing node 104, provider preparation node 106, content providing node 108, content requesting node 110, authorizing node 112, banking node 114, event reporting node 116, and reconciling node 118.

In operation, for content to be transferred on request to any of perhaps millions of content requesting nodes, the content is first received from a source and formatted for storage on one or more of perhaps thousands of content providing nodes. Initially, a content developer, publisher, or distributor provides digital works, for example multimedia files, to content acquisition node 102 for encoding in a format efficient for storage and access by content managing node 104. Content is conveyed on line 130 as it becomes available for management by content managing node 104. Content from content managing node 104 is conveyed on line 132 and then made unique to each content providing node 108 by formatting processes performed by provider preparation node 106. Content providing node 108 receives content from time to time from provider preparation node 106 on line 134.

To request a data transfer in a preferred embodiment for the Internet, a user or consumer at content requesting node 110 uses a network browser, such as Microsoft Internet Explorer, and follows an Internet link (clicks on a portion of an HTML file display), causing a message in HTTP format to be conveyed on line 136 to content providing node 108. Content providing node 108 forwards the request on line 138 to authorizing node 112. If the request is valid, authorizing node 112 creates a permit and sends it on line 146 to content requesting node 110. A permit is a message created to uniquely respond to the request from a particular content requesting node. Using portions of the permit, content requesting node 110 requests on line 136 particular files from content providing node 108. In response, such particular files are conveyed on line 148 to content requesting node 110, completing the data transfer.

Accounting for the above described transfer of content includes, for example, receiving payment from the user of content requesting node 110, making payment for distribution services to at least the operator of content providing node 108, and making payment to one or more owners of rights in the content. These accounting transactions find accurate basis in a reconciliation of reports from a variety of network nodes that are reported at separate times during the data transfer process. For example, when authorizing node 112 receives the request and queries an access authority data base on content managing node 104 via lines 140 and 142, content managing node 104 logs the query and reports the log on line 156 from time to time to reconciling node 118. With knowledge of the identity of content requesting node 110, an identity of the user, and a price of the requested work for a requested purpose (for example, copy or preview), authorizing node confirms a debit of an account kept on banking node 114 by messages conveyed on line 144.

Banking node 114 logs the debit and reports the log on line 154 from time to time to reconciling node 118. When the data transfer begins and again when at least some of the data has been transferred, content requesting node 110 reports on line 150 to event reporting node 116. Event reporting node 116 logs the events and from time to time reports the log on line 152 to reconciling node 118. By comparing reports received on lines 152, 154, 156, and possibly 158 (from content providing node 108), reconciling node 118 distinguishes valid complete data transfers from incomplete transfers and from events that could indicate intentional interference with the integrity of network 100. For each valid complete transfer, reconciling node 118 allocates revenues generated from the debits of users' accounts, discussed above with reference to line 144. Reconciling node 118 then initiates funds transfers with messages to banking node 114 on line 160 for payments of, for example, distribution fees and royalties.

Each node of network 100 may represent more than one conventional computer system that performs, inter alia, methods of the present invention. Multiple computers or multiple data storage devices may be necessary for maintaining a particular node's functions operational in periods of high network traffic. Such multiple computers may be at various physical locations, provided that only one network node address (for example, an IP address) is associated with each node.

A method of the present invention for preparing content for storage on a content providing node includes separation of content and map information. When content is divided for convenience into several files in a conventional file storage system, map information identifies the particular files from the entire inventory on the storage system and the order of presentation of the files for reconstituting a particular work. Separation of content and map information facilitates security measures without unduly compromising rapid provision of a work or performance of a work on a content requesting node.

Figure 2:
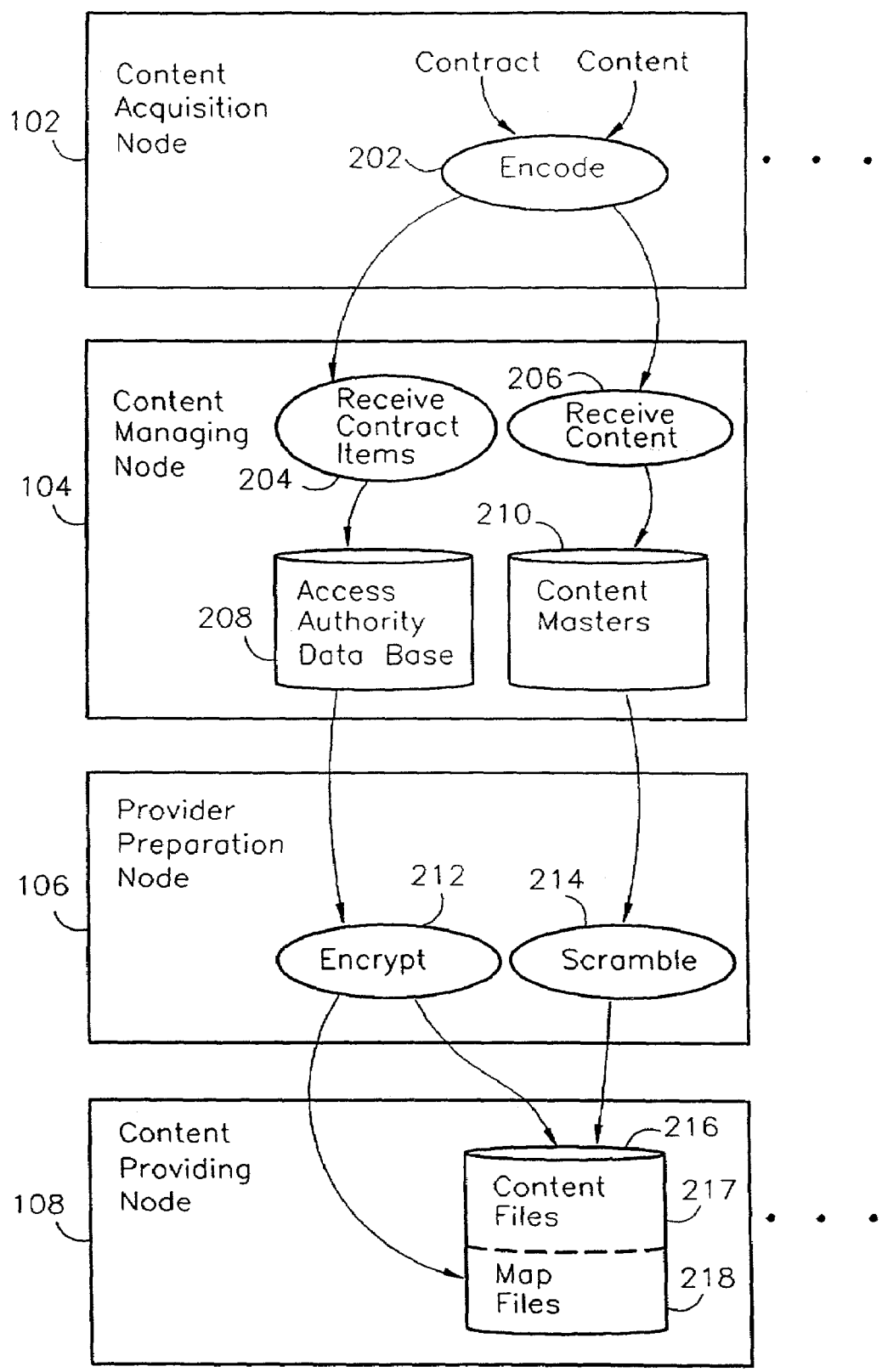
FIG. 2 is a data flow diagram for a portion of the network of FIG. 1 that, inter alia, creates content files on a content providing node.

For example, as shown in FIG. 2, content acquisition node 102 encodes (using conventional data formatting and compression technology) contract items associated with the work and encodes the work itself. When the work is primarily an audio recording, contract items may additionally include: name of the album, producer, label, publisher, mail order company, publishing year, bar code, album and track distribution levels, title of a track, performers, authors, composers, ISRC code for the title, language, track number, duration, extract start and end times, number of allowed copies, price to preview (listen), price to make copy, rights collecting societies, authorized distribution areas, album cover picture, liner notes, other graphics, music style, associated country, and possibly pictures associated with the recording and text to be shown while the work is being played. Receiver processes 204 and 206 (using conventional communication and data storage technology) on content managing node 104, receive the encoded contract items and content and store each respectively on access authority data base (AADB) 208 and content masters store 210.

When a particular content providing node 108 is identified, works to be provided by that node are selected from content masters store 210 and scrambled by process 214 (using conventional data security technology). Scrambling is a preferred (though weak) form of encryption that allows some security without unduly burdening data transfer or use of the work when requested. The scrambled result of a work is combined with a header, which includes encrypted data from access authority data base 208, to form one or more content files. Content files 217 are transferred for storage on store 216 of content providing node 108.

Process 212 prepares map files 218 for transfer and storage on store 216. Descriptors of the work, of the content files, and of content providing node 108 are obtained from AADB 208 and formatted and encrypted by process 212 (using conventional data formatting and encryption technology). Some or all of the descriptors, alone or in combination, may be subject to rigorous encryption. The map file permits content file locations to be random or at least unpredictable in store 216, substantially decreasing the likelihood of unauthorized access without the system performance penalties associated with encrypting content files 218 on store 216.

Figure 13:
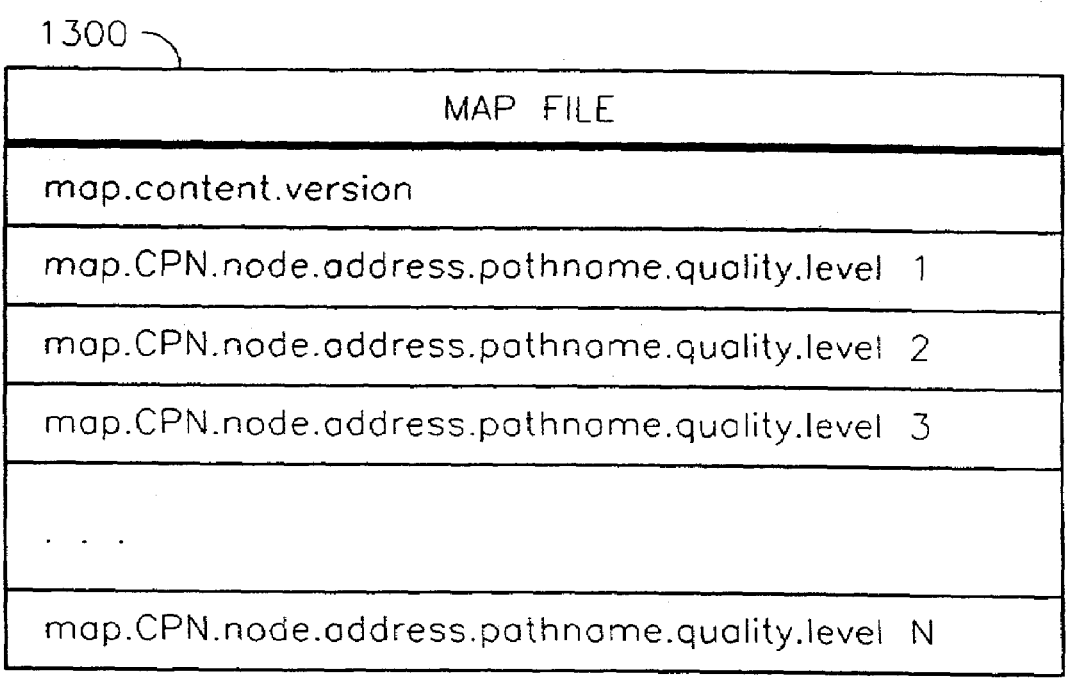
FIG. 13 is a memory map of a data structure of a map file of the present invention.

In a preferred embodiment for an audio recording, the map file includes a version number of a group of content files and a node address and pathname to each content file of the group. The node address corresponds to the unique node address of the content providing node for which content files are being prepared. Each node address and pathname is encrypted separately. Each content file of the group provides a different level of sound quality for the same audio material. Different levels of quality provide, for example, flexibility in meeting the audio fidelity of different content requesting nodes. FIG. 13 illustrates an example map file data structure 1300 when instantiated in memory at provider preparation node 106. FIG. 14 illustrates an example data structure 1400 of a header of a content file when instantiated in memory at provider preparation node 106.

Content files 217 and map files 218 are organized for convenient access on store 216 using a conventional file system such as a directory system, shadowed physical drives, or a RAID system.

As indicated by ellipsis in FIG. 2, many content acquisition nodes may supply content to content managing node 104. Many content providing nodes may be supplied with content files from content managing node 104. Due to differing security and traffic support requirements, it is preferred to operate network 100 with physically separate nodes 104 and 106. In a variation, the functions of nodes 104 and 106 may be combined on one node or combined with content acquisition node 102.

Various methods of the present invention for data transfer use to advantage (a) the cooperation of several network nodes, (b) linking a request through a registered node, (c) creating a permit using data from multiple sources, (d) using encryption, current time of day, or encryption keys based on unique properties of a node, and/or (e) providing unique structures and separate access to content files and map files. These features, inter alia, accomplish validating the request, validating the permit, and validating the data transfer operation itself. When validation is unsuccessful, data transfer is stopped, preserving the integrity of network 100. The integrity of network 100 may be compromised by unauthorized copying, transfer, or use of a digital work.

Figure 3:
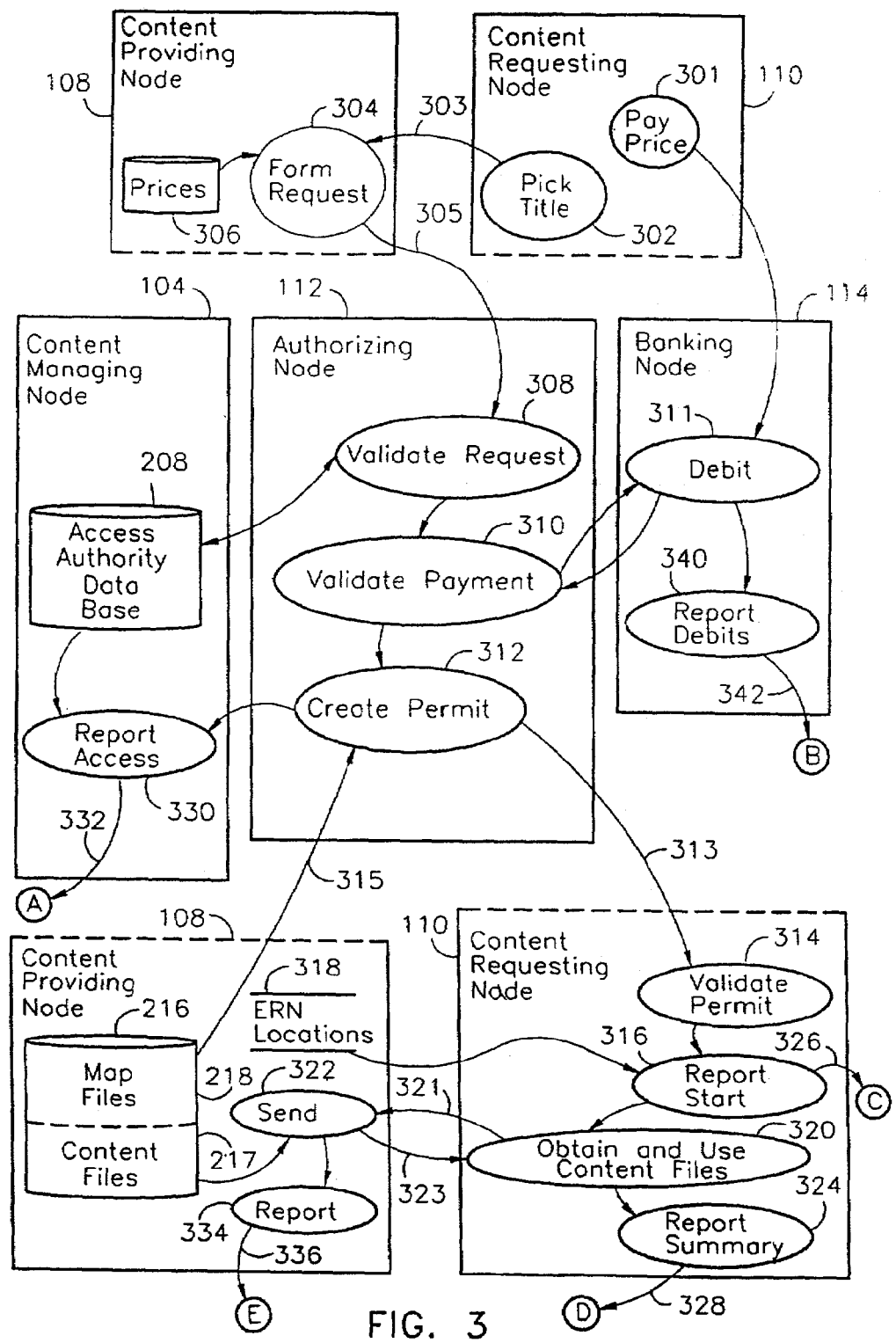
FIG. 3 is a data flow diagram for a portion of the network of FIG. 1 that, inter alia, satisfies a data transfer request.

For example, as shown in FIG. 3, a data transfer begins at content requesting node (CRN) 110. There a consumer or service user obtains a listing of titles, each title for a digital work. Process 302 (using a conventional browser and operating system) responds to user input, for example a mouse switch closure ("click") when an on-screen cursor points to a portion of an HTML page identifying a title, and in the conventional manner generates a message 303 to content providing node (CPN) 108. Process 304 (using conventional HTTP message technology) forwards the request 305 to authorizing node (AN) 112. FIG. 15 illustrates an example request data structure 1500 when instantiated in memory at authorizing node 112. In a variation, process 304 determines the price to be billed for the request type and title and includes price and price currency with the forwarded request. Price information is stored in file 306 which is available for editing by the operator of content providing node 108. In a preferred embodiment, validate payment process 310 obtains price information via the associated map file from each content file after the validity of the request has been determined.

Figure 6:
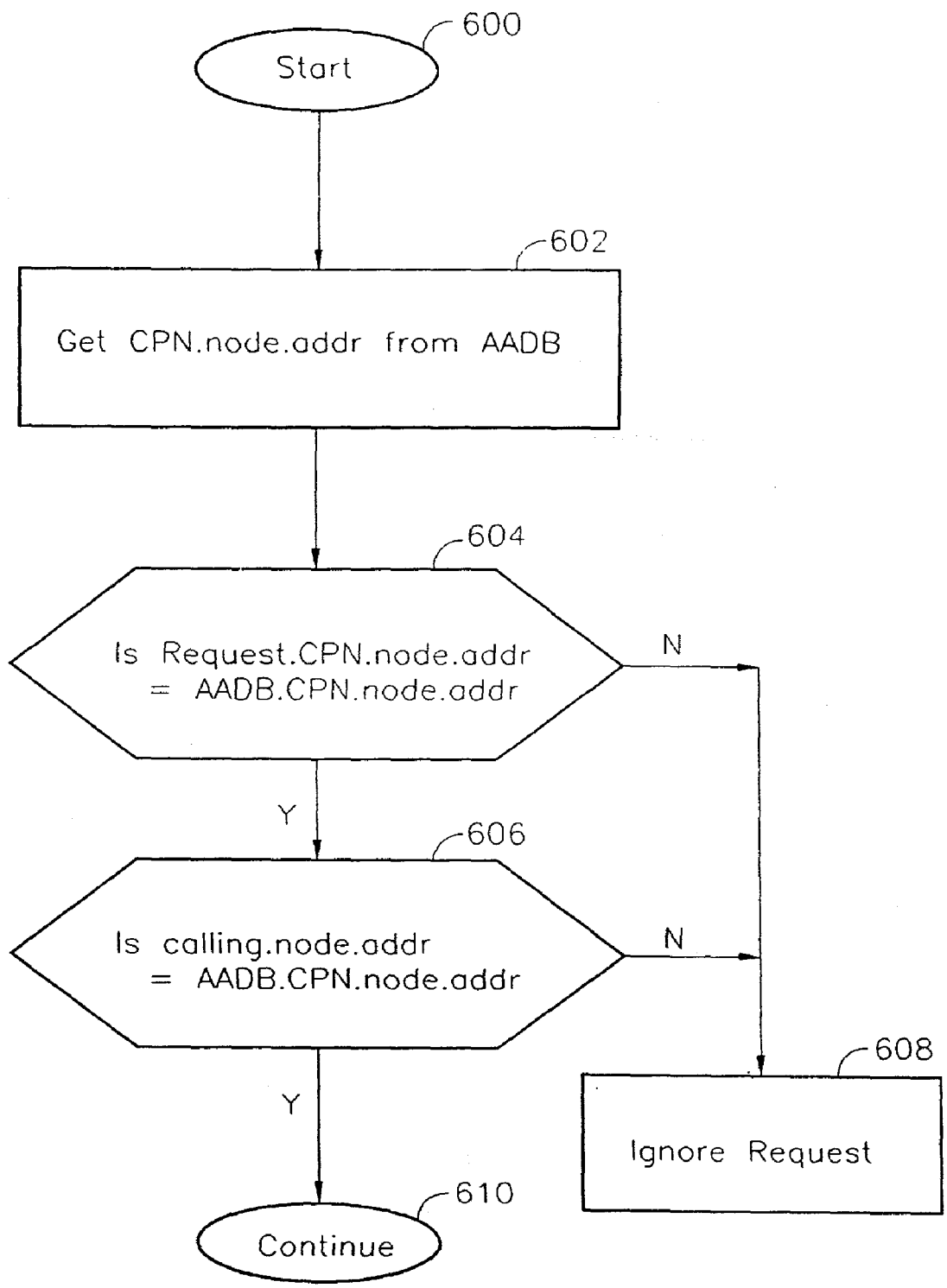
FIG. 6 is a functional flow diagram for a portion of a method of validating a request by an authorizing node.

Process 308 validates the request by denying further processing to requests that do not meet predetermined criteria. In one variation, shown in FIG. 6, process 308 includes the steps beginning at step 600. At step 602, the node address of content providing node (CPN) 108 is obtained from access authority data base (AADB) 208. At step 604, the CPN node address as provided in request 305 is compared to the CPN node address as provided from AADB 208. If a match is found, control passes to step 606, else to step 608 where the request is ignored. At step 606, the node address of the calling page (which contains the link that was followed by process 302) is compared to the CPN node address provided by AADB 208. If a match is found, the request is considered valid and control passes to process 310, else to step 608 where the request is ignored.

Process 310 (using conventional data base and communication technology) validates payment by the user by confirming that the user (via pay price process 310) has made a proper debit on the user's account. If a debit cannot be confirmed, request 305 is ignored. If confirmation of the debit transaction is successful, control passes to process 312.

Figure 7:
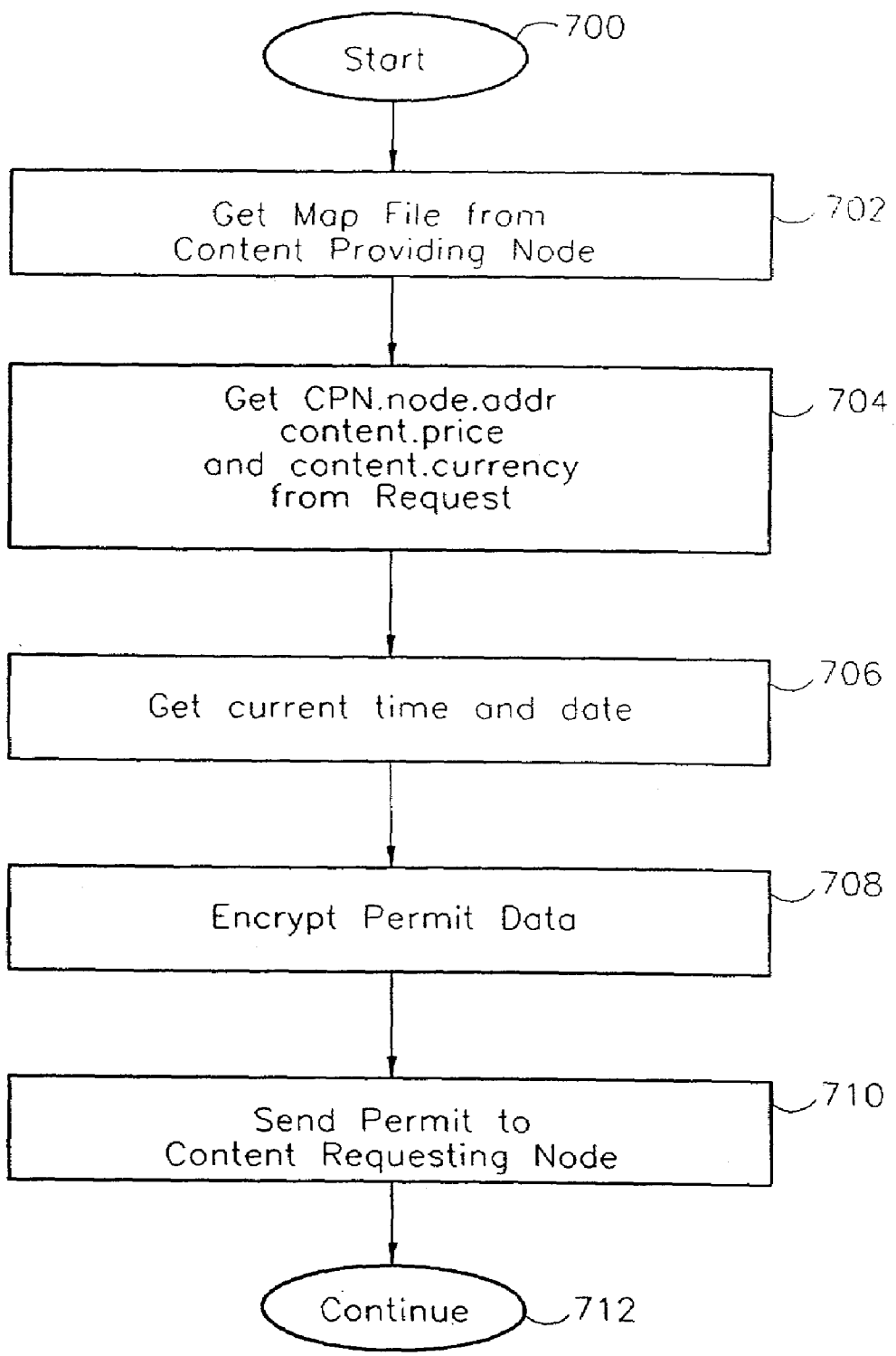
FIG. 7 is a functional flow diagram for a portion of a method of creating a permit by an authorizing node.

Process 312 creates a permit by combining information from more than one source. In one variation, shown in FIG. 7, process 312 includes the steps beginning at step 700. At step 702, a map file 315 for the requested content is obtained either from the request or from store 216 on content providing node 108. At step 704, content providing node address, content price, and price currency are obtained from request 305. At step 706, local date and time are obtained from the authorizing node 112. These data items are arranged, for example, in data structure 1600 instantiated in memory of authorizing node 112, as illustrated in FIG. 16. At step 708 some or all data in permit data structure 1600 are encrypted to provide permit 313. At step 710, permit 313 is sent to content requesting node 110.

Figure 8:
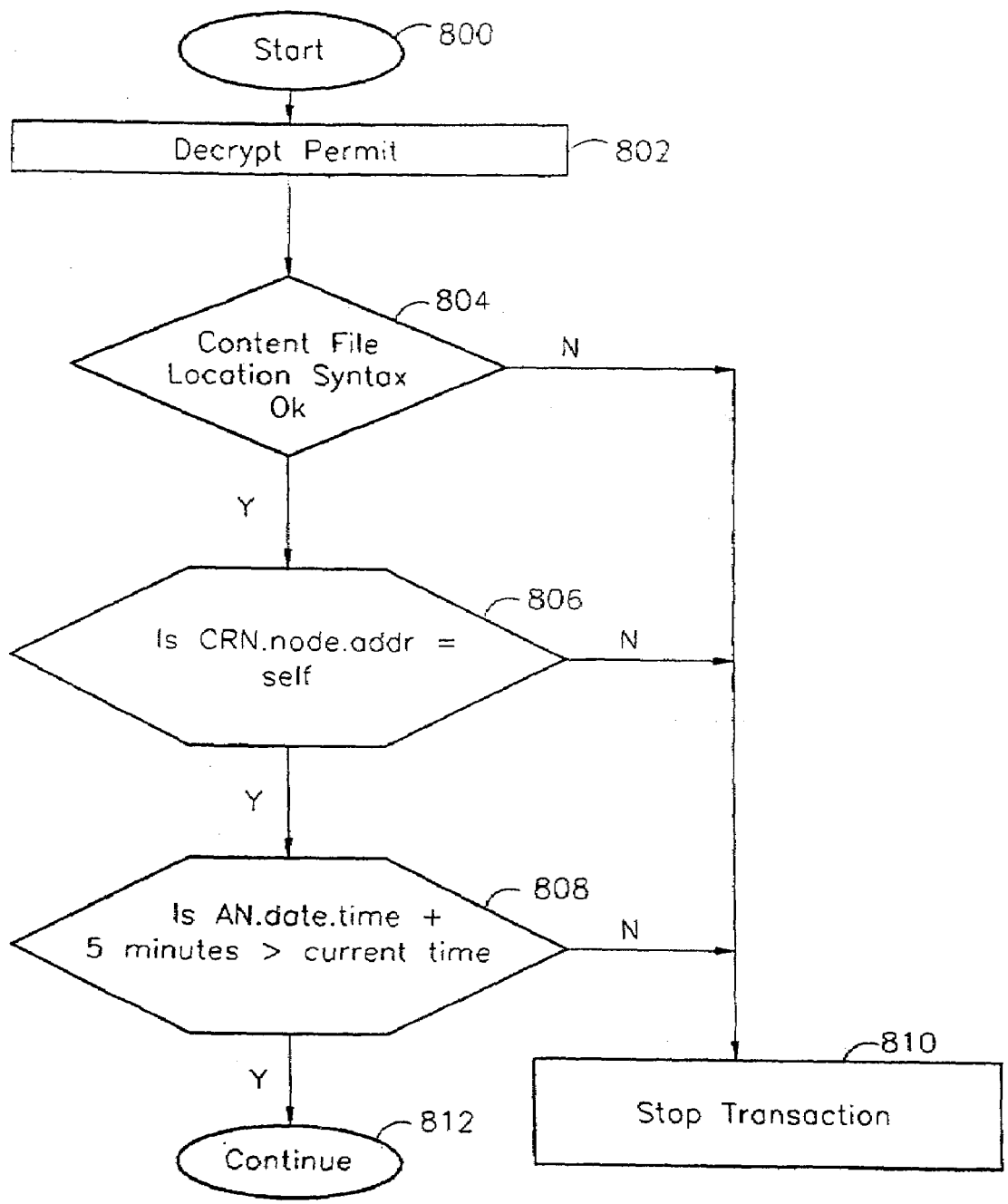
FIG. 8 is a functional flow diagram for a portion of a method of validating a permit by a content requesting node.

Process 314 validates the permit by stopping the transaction for permits that do not meet predetermined criteria. In one variation, shown in FIG. 8, process 314 includes the steps beginning at step 800. At step 802, that portion of the permit that is encrypted is decrypted. At step 804, the syntax of each content file location (content.CPN.node address.pathname) is checked. The several pathnames in the permit provide ready access to the content file matching the sound quality level specified in request 305 (see FIG. 15, request.sound.quality). If the syntax check fails, control passes to step 810 to stop the transaction. Otherwise control passes to step 806 where the content requesting node address provided in permit 313 is compared to the node address of content requesting node 110. If no match, control is transferred to step 810. If a match is found, control passes to step 808, the current date and time on content requesting node 110 is compared to the date and time value stamped by authorizing node (AN) 112 on permit 313 (AN.date.time). If the current time is more than a predetermined amount (for example, 5 minutes) after AN.date.time, then control passes to step 810 and the transaction stops. Otherwise, control passes to step 812 and, in due course, to process 316.

Process 316 reports the start of a data transfer between content providing node 108 and content requesting node 110. Generation of the report may occur before data transfer actually starts or during an initial phase of data transfer. A start report is made to one or more event reporting nodes as specified by a list on content providing node 108. The report is transmitted by packet message techniques on a separate port so as to avoid interference with the data transfer itself which may be underway on another port. The two ports may share the same communication hardware such as a single line to an Internet Service Provider, as is well known in applications of TCP/IP. For other communication hardware and software configurations, concurrent ports may be arranged on two or more hardware communication links.

Figure 9:
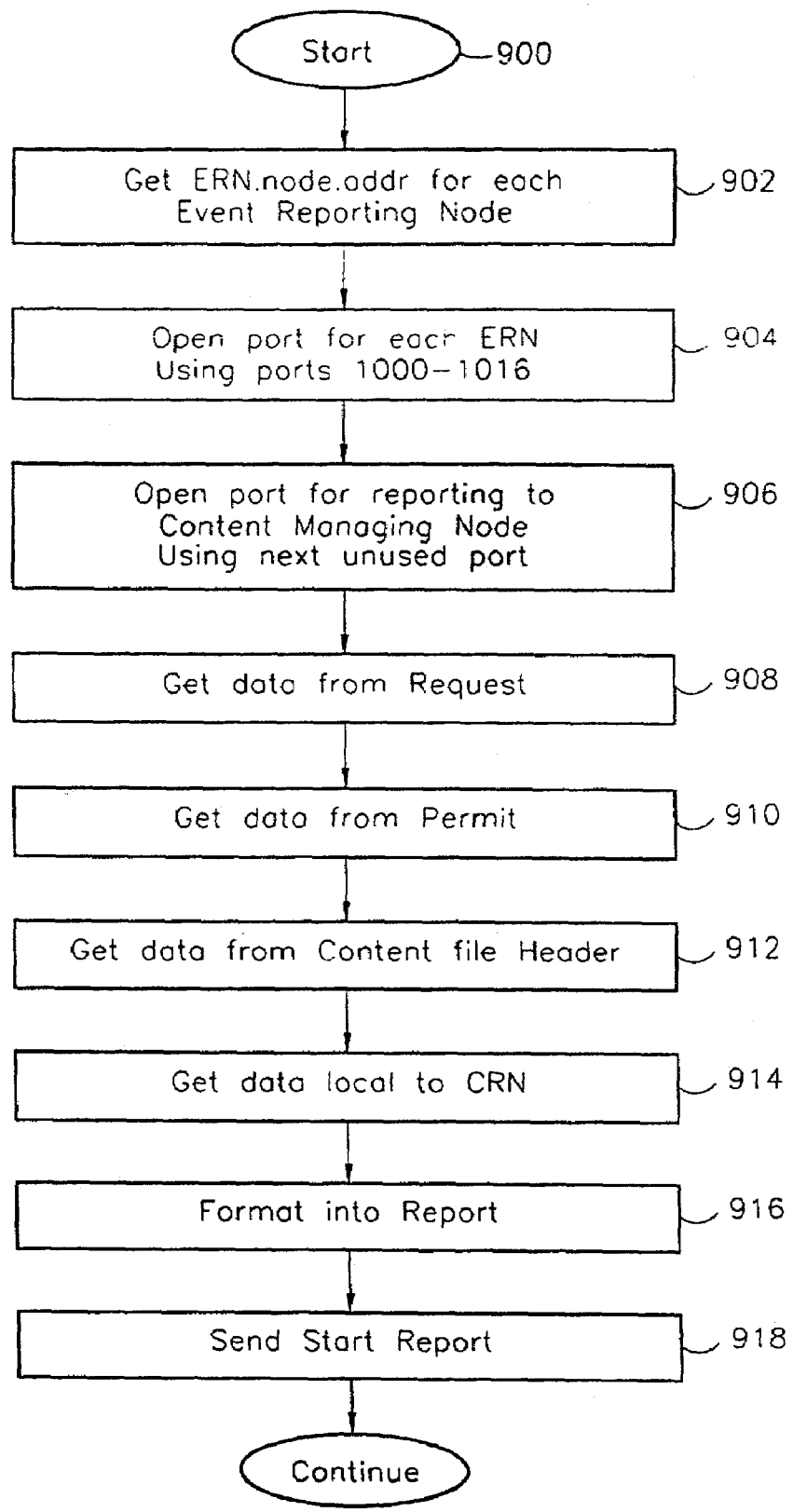
FIG. 9 is a functional flow diagram for a portion of a method of reporting, by a content requesting node, a start of data transfer.

In one variation, shown in FIG. 9, process 316 includes the steps beginning at step 900. At step 902, one or more event reporting node addresses and the content managing node address are obtained from list 318 on content providing node 108. At step 904, a port is opened for each event reporting node on list 318. In a preferred embodiment, ports 1000 through 1016 are used, although other port numbers may be equivalently accommodated by the communication software on content requesting node 110. If no event reporting node successfully responds after attempts have been made to couple it for communication, then either the transaction is stopped or the transaction continues without the capability to generate reports. At step 906, a port is opened for reporting to content managing node 104, using the next available port number from the range 1000 through 1016. At step 908, information from request 305 is obtained and placed in a data structure in memory. FIG. 17 illustrates a start report data structure 1700 when instantiated in memory at content requesting node 110. For data structure 1700, such data includes the content requesting node address, the username and password, and the price, currency, and specified sound quality. At step 910, data from permit 313 is added to the start report data structure. For data structure 1700, such data includes the content file location for the specified sound quality level, i.e. a corresponding content.CPN.node.address.pathname.quality.level. At step 912, data from the content file header is added to the start report data structure. For data structure 1700, such data include the title, artist, copyright, duration, ID.code.type (whether ISRC, ISWC, or etc.), the ID.code.number, the content providing node address, and a file number (a serialized number assigned by encoding process 202). At step 914, local values of the content requesting node are added to the start data structure. For data structure 1700, such values include a transaction number for discriminating reports from the same user, the current date and time, an encryption key unique to the content requesting node, and values from which the country in which content requesting node 110 is located. These later values include in one variation of the present invention, the time zone, the language identified by the operating system of node 110 and the keyboard identified by the operating system of node 110. Country location is important to allocating royalties under the laws that vary from one jurisdiction (country) to another. At step 916, the report is placed in final format using conventional techniques and at step 918 it is sent to each event reporting node, for example node 116, and to content managing node 104.

Figure 10:
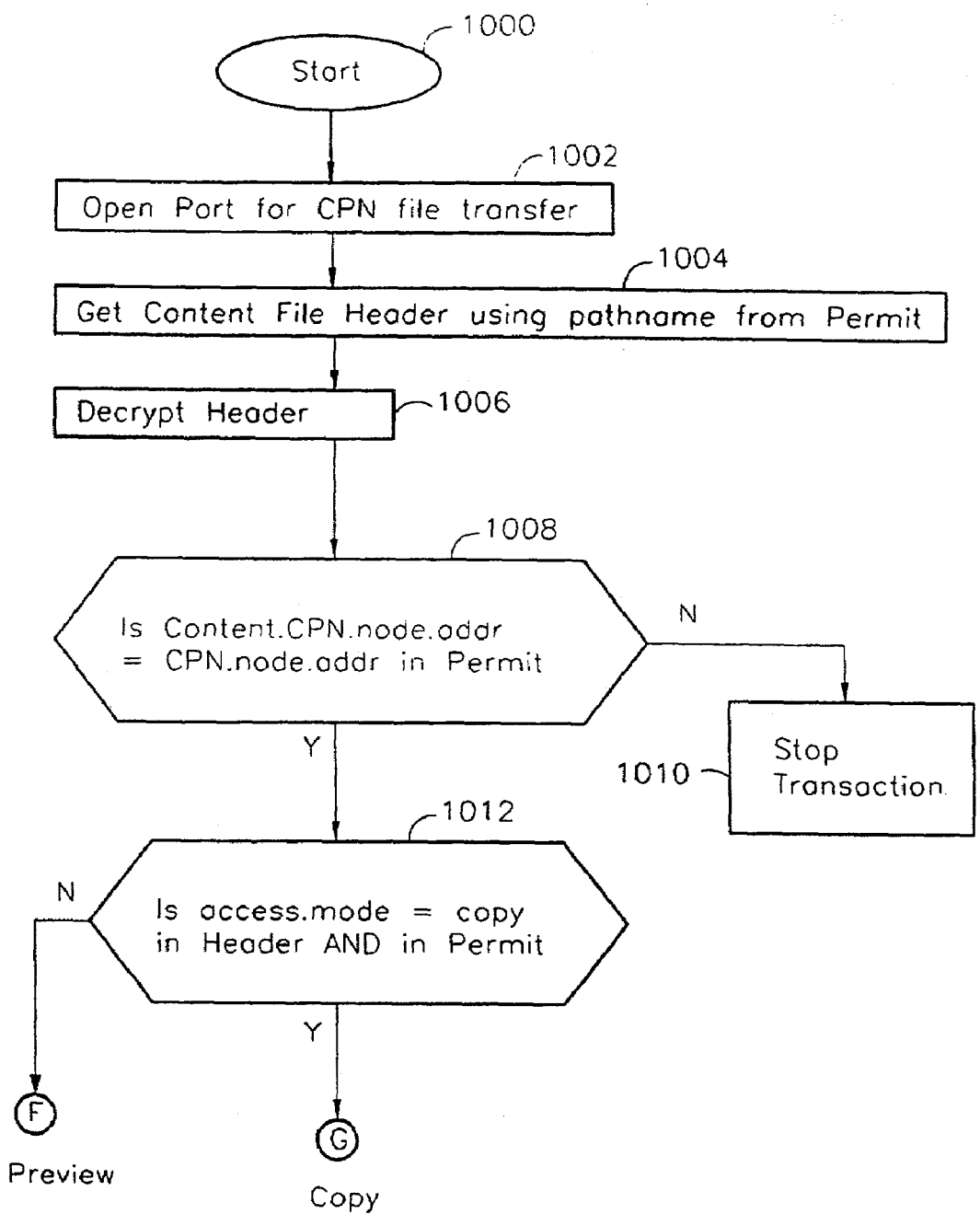
FIGS. 10 through 12 are functional flow diagrams for portions of a method of obtaining and using content files and reporting a summary of data transfer.

Process 320 obtains and uses the requested content files. After a content file header has been received by process 320, the transaction may be stopped if contents of the header do not compare favorably with the permit. In one variation, a summary report is prepared before data transfer of all requested files is complete. Further requests for files may be made in response to receiving an acknowledgement that the summary report has been received by the event reporting node. In a second variation, a duration of use of the files is measured and reported in a summary report, prepared and sent after all files have been received or usage is determined to be substantially completed. In the later case, shown in FIG. 10, process 320 includes the steps beginning at step 1000. At step 1002, a port is opened for content provider node file transfer (in addition to ports opened for reporting as discussed above). At step 1004, the header of the requested content file is obtained. The pathname to this content file is provided in permit 313 for a corresponding sound quality of content requesting node 110. After decrypting the pathname itself, at step 1006, the header of the specified content file is decrypted. At step 1008, if the content providing node address in the obtained content file header does not match the content providing node address as permitted, the transaction stops at step 1010. Otherwise, control passes to step 1012.

Figure 11:
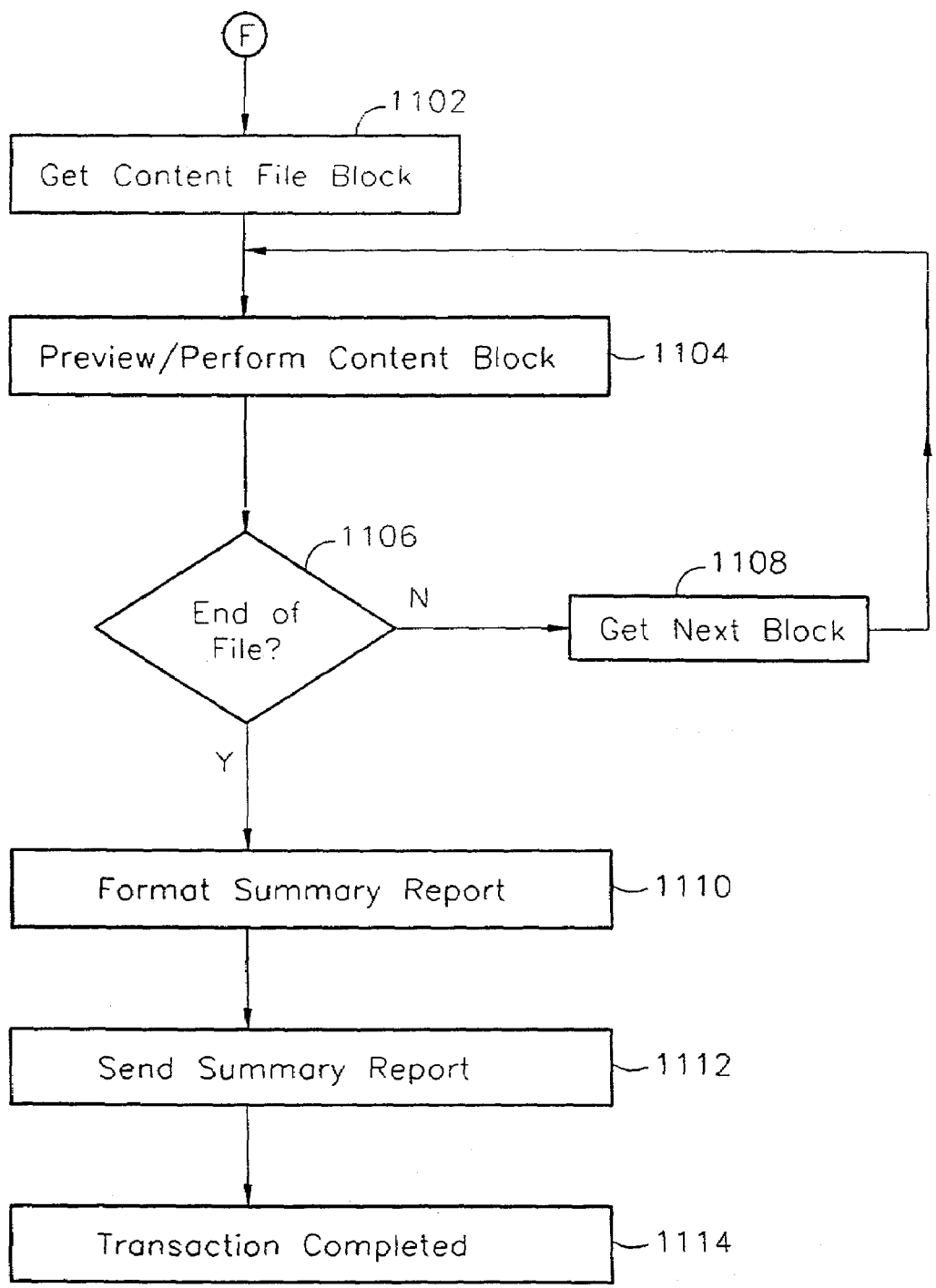
Figure 12:
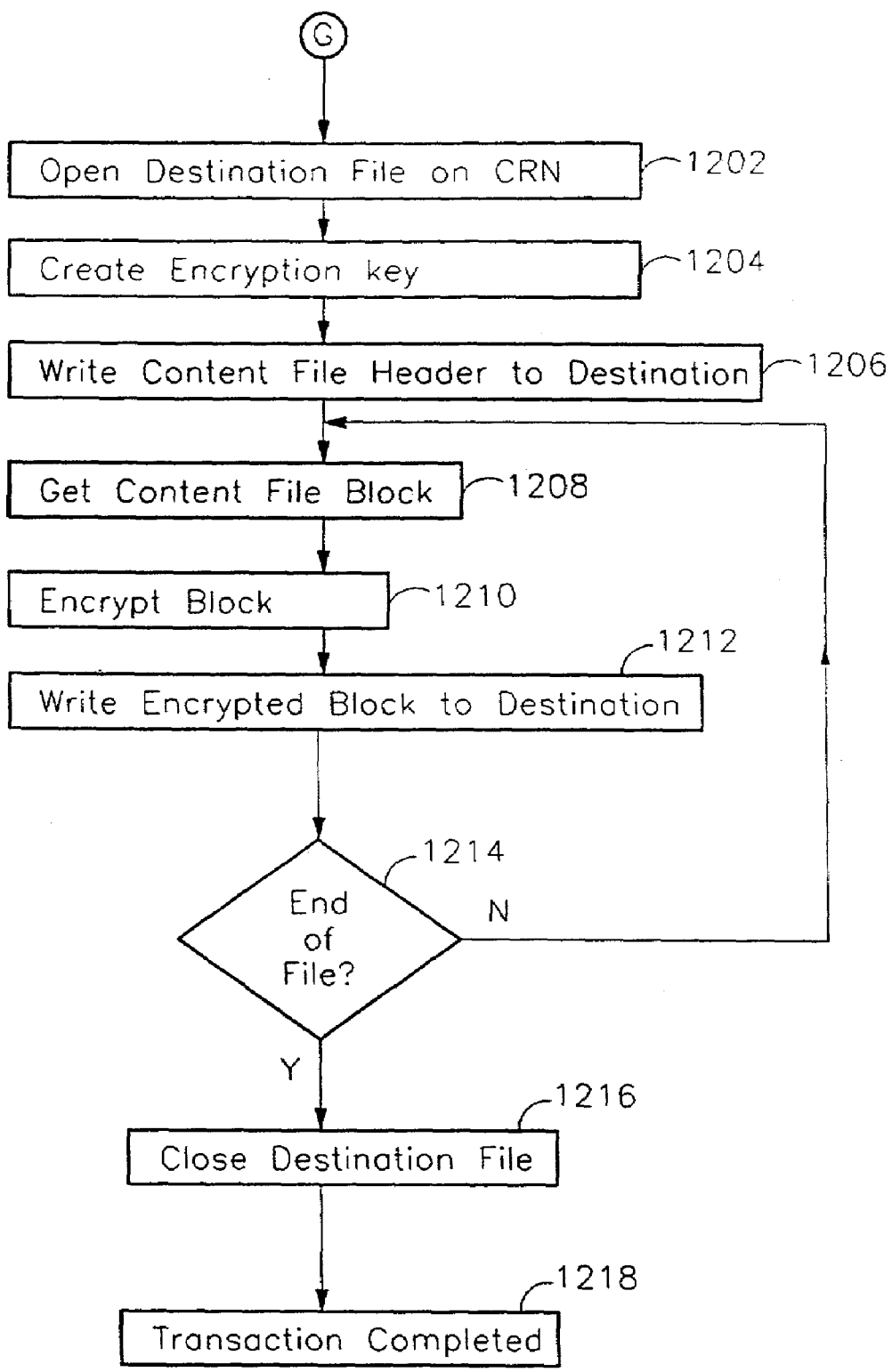

At step 1012, the usage mode as permitted is compared to the usage mode as requested. The user specifies a usage mode at the time of picking a title for a digital work to facilitate calculation of an appropriate price. For example, in many cases, the price for previewing a work (as in listening to a portion of an audio work) is less than the price for making a copy of a work for unlimited use. If the requested and permitted usage modes both indicate a copy is to be made, that is, the data transferred will be stored for repeated use, then control passes to step 1202 on FIG. 12. Otherwise, control passes to step 1102 of FIG. 11. Steps 1102 through 1108 obtain all subsequent blocks of the requested content file and, after each block is received, perform the digital work according to the data in that respective block. Unscrambling of the data may be required. Performance or preview may be, for example one or more of the following: playing audio, showing visual, performing multimedia, or executing computer program digital works. For example, when an audio file is being received, unscrambling is performed and the resulting data may be played without interruption.

At step 1110, information from several sources is combined to form a summary report. One purpose of the summary report is to indicate for purposes of reconciliation, the duration the digital work was being performed. FIG. 18 illustrates a summary report data structure 1800 when instantiated in memory at content requesting none 110. For summary report 328, data items from start report structure 1700 (having the same names) are formatted in summary report data structure 1800. At step 1112, the summary report is sent through ports opened in steps 902 and 904 to one or more event reporting nodes. The transaction is completed at step 1114.

If at step 1012, a copy of the work has been permitted, control passes to step 1202. At step 1202, a destination file for receiving the digital work is opened on the content requesting node 110. At step 1204, an encryption key is prepared using conventional data security technology. At step 1206, the content file header is obtained and written to the destination file. At steps 1208 through 1214, each block of the requested content file is obtained, encrypted, and written to the destination file. At step 1216, the destination file is closed. At step 1218 the transaction is completed.

From time to time, reports are generated by various nodes for checking the integrity of network 100 and for allocating revenues received by debiting user accounts as described with reference to FIG. 3 process 310. Five reports are provided in network 100. Access report 332 is provided by content managing node 104 from queries of AADB 208 initiated by authorizing node processes 308 through 312. FIG. 19 is a memory map of data structure 1900 of an access report record when instantiated in memory of content managing node 104 or reconciling node 118. Report 342 is provided by banking node 114 from debit transactions requested by process 310 of authorizing node 112. FIG. 20 is a memory map of a data structure of a debit report record when instantiated in memory of banking node 114 or reconciling node 118. Reports 326 and 328 respectively provide the start and summary information from content requesting node 110. Data structures 1700 and 1800 correspond to a single record of the start report and summary report respectively when instantiated in memory of reconciling node 118. Finally, report 336 describing what content files were sent and when sent may be generated by content providing node 108.

Each report consists of multiple records, each record having multiple fields. Because these reports have some fields in common, comparison of the data in identical fields ("reconciliation") provides the basis for distinguishing valid complete transactions from interrupted and unauthorized transactions. For example, an access report record 1900, debit report record 2000, start report 1700, and summary report 1800 each include a tracking field for the value: request.CRN.node.address.transaction.number. By noting whether all four records having the same value for this tracking field have been received at reconciling node 118, conclusions about network integrity and allocation of funds can be reliably made.

A method for reconciling reports of the present invention includes accommodations for high volume event report processing. In addition, reconciled reports may be used to identify nodes having suspect operations and thereby provide a way of detecting unauthorized copying and use of digital works.

In combination with the operation of the AADB 208, unauthorized use may be blocked. For example, if unauthorized transactions frequently involve the same content providing node address, that node address may be deleted from the list of registered content providing nodes by an appropriate operation on AADB 208. When a content requesting node makes a request through the link at the offending content providing node address, the request will be denied at the authorizing node.

Figure 4:
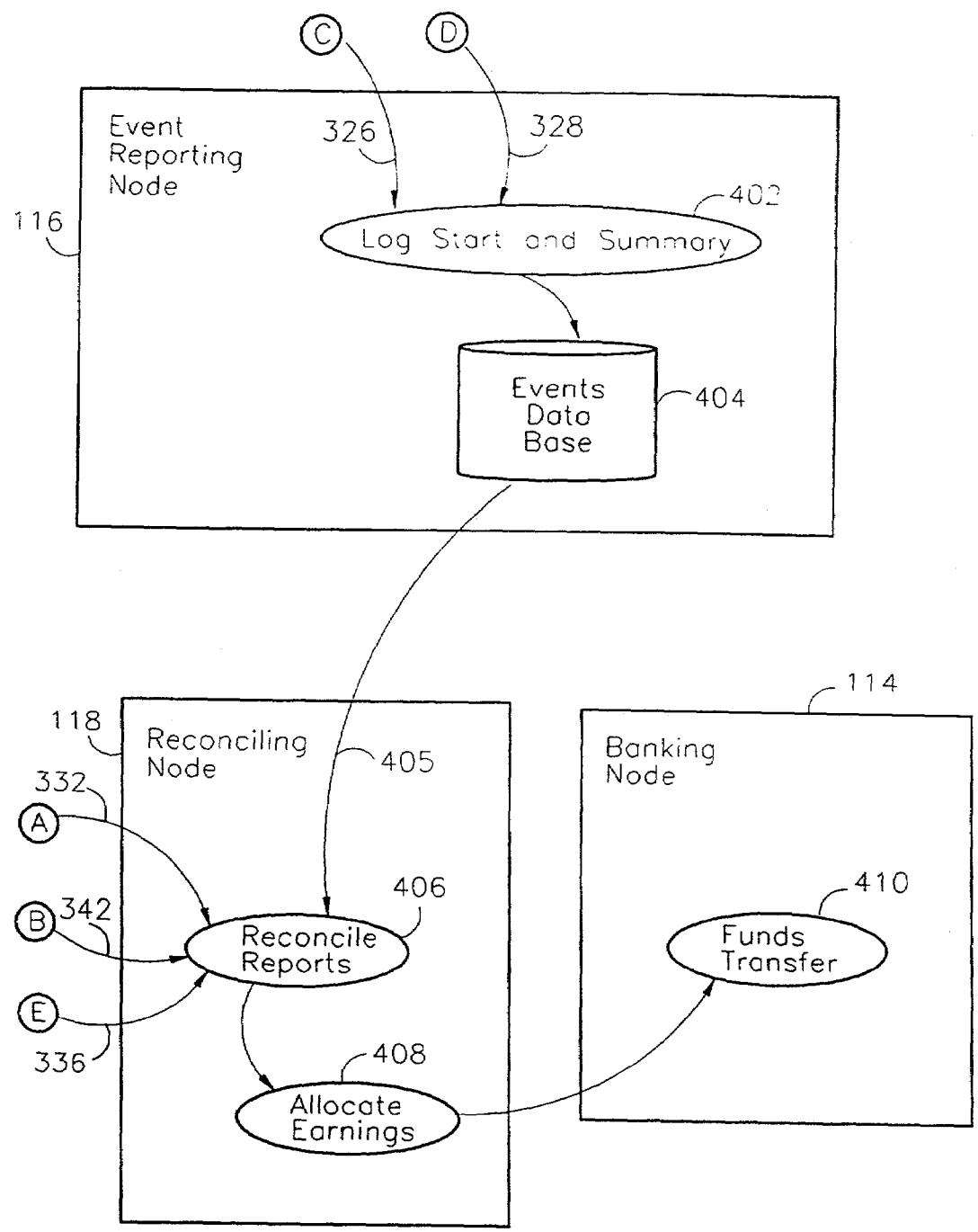
FIG. 4 is a data flow diagram for a portion of the network of FIG. 1 that, inter alia, accomplishes payments, for example, to owners of rights in data transferred.

An example of a reconciliation method of the present invention is illustrated in FIG. 4. Event reporting node 116 receives start report 326 and summary report 328 at high traffic levels from numerous content requesting nodes. Each report is logged as an event by process 402 using conventional database technology. Logged events are stored for a time in events data base 404. Synchronization of multiple parallel event reporting nodes may result in additional database transactions by event reporting node 116 as to records in events data base 404.

From time to time records from events data base 404 are provided to reconciling node 118. Process 406, using conventional data base technology, accomplishes the comparison of records having one or more respective field values that are identical. In one variation, the tracking field is used exclusively. Table 502 in FIG. 5 identifies results of reconciliation for several combinations of reports being reconciled. If for a given tracking field value (or at a given time, date, content requesting node, and content providing node), reports A 332, B 342, C 326, D 328, and possibly E 336 have been logged, then a group of messages accomplishing a normal request and payment for data transfer can be inferred to have been completed successfully. Allocation of earnings by process 408 follows the identification of such a reconciliation result.

If on the other hand, one or more of the expected reports is not timely received for reconciliation having the given common field values, then it can be suspected that software on one or more nodes of network 100 may have been manipulated, compromising network integrity. Due to the large number of content requesting nodes and the lack of physical controls that could protect software on such nodes from being manipulated, it is likely that at least some of the failures to receive all expected reports may be a consequence of content requesting node software manipulation. In cases 508 and 510, some or all requested data transfer might have been successful; however, allocation of earnings may not be justified when there remains a possibility that a user of the respective content requesting node may insist that the debit to his account be reversed.

Allocation of earnings by process 408 is consummated by generating, according to conventional banking messaging and data base technology, requests for funds transfer by process 410 in banking node 114.

As described in detail above, network 100 overcomes the problems of the prior art and provides a basis for accurate allocation of earnings to the owners of rights in digital works stored on systems of the present invention or transferred according to methods of the present invention. These and other benefits are provided with lesser system performance penalties than heretofore possible.

Particular data transfers in various embodiments of the present invention proceed over one or more interfaces that are maintained to prevent unauthorized access to the system that sent the data. Access may be to read data from the sender, change data stored by the sender (e.g., overwriting the data, modifying the data, or revising references to the data), or execute programs on a processor of the sender. According to various aspects of the present invention, data transfer across such an interface is conditionally permitted according to a protocol. Such a transfer is herein called a protected transfer which includes any transfer that provides a barrier to unauthorized access by omitting information that would facilitate further access if such information were available in association with the transfer. When source identification is not apparent to a receiver or receiving process, the protected transfer is an anonymous transfer from the point of view of the receiver or receiving process.

For example, permit 313 is transferred across an interface that includes a network link between nodes 112 and 110 illustrated by line 146 and a protocol. The transfer is conditional according to the protocol. The protocol includes prerequisite events such as, inter alia, receiving request 315 and validating payment by process 310. As discussed above, the network link (line 146) is enabled for transferring (e.g., sending permit 313) without prerequisite action by the receiver of the permit (e.g., node 110); the permit is sent as an anonymous transfer; and the transfer of the permit is conditioned upon receiving a request 315 that includes information for facilitating sending the permit (e.g., a network address of the content requesting node 110). Each of these aspects of the transfer of the permit to content requesting node 110 is an aspect of the interface between nodes 112 and 110 and constitutes a barrier to unauthorized access to the sender, node 112, by processes at the receiver, node 110. The protected transfer is anonymous because it is sent without including complete identification of the sender in a manner that is apparent to the receiver or receiving process. For example, the following information may not be apparent to content requesting node 110 and/or process 314: the network node address of node 112, the network node address of the sender (e.g., a firewall system being part of node 112 or indirection of network node addresses used by node 112), identification of process 312, or identification of ports and links used in the transfer.

A protocol includes any system for maintaining and changing state on one side of an interface in accordance with an ordered sequence of states and predefined criteria for state change. A process or circuit that supports a protocol monitors to detect events; compares events to criteria for state change from a current state to a next state of the sequence; and, in response to detecting prerequisite event(s), changes the maintained current state to the next state. The sequence may define multiple ways of entering or leaving a particular state, each way associated with respective criteria.

A process (e.g., an application program, an operating system, or any of the processes described with reference to network 100 and system 2500) may effect transfer of data across an interface using a port on each side of the interface. The port may be integral with the process or a separate functional entity. A port is a process or mechanism that provides or accepts data across an interface (e.g., via a link, a bus, or a signal path) in accordance with a protocol by detecting events, keeping state, and changing state in response to detected events.

Data may be made secure from unauthorized access by eliminating interfaces between subsystems that store the data and subsystems that may desire access to the data. Elimination may include preventing a link from being established, disconnecting a bus, or blocking a signal path.

Where an interface which could be misused exists, the risk of unauthorized data transfer across the interface may reduced by adding a protocol to the interface (e.g., requiring transfers to occur through ports), restricting state transitions in a protocol used at the interface, and/or using protected transfers as discussed above. For example, detection of particular events (e.g., known security attack techniques) by ports at the interface may lead to denial of access, and a larger number of intricate events (e.g., being able to provide correct identification of node addresses, ports, subsystems, and processes related to the transfer or existing at the interface, identification of a receiver or sender, presentation of credentials of the receiver or sender and processes at the receiver or sender), may be set as criteria for gaining entry to a state in which transfer is permitted.

Figure 21:
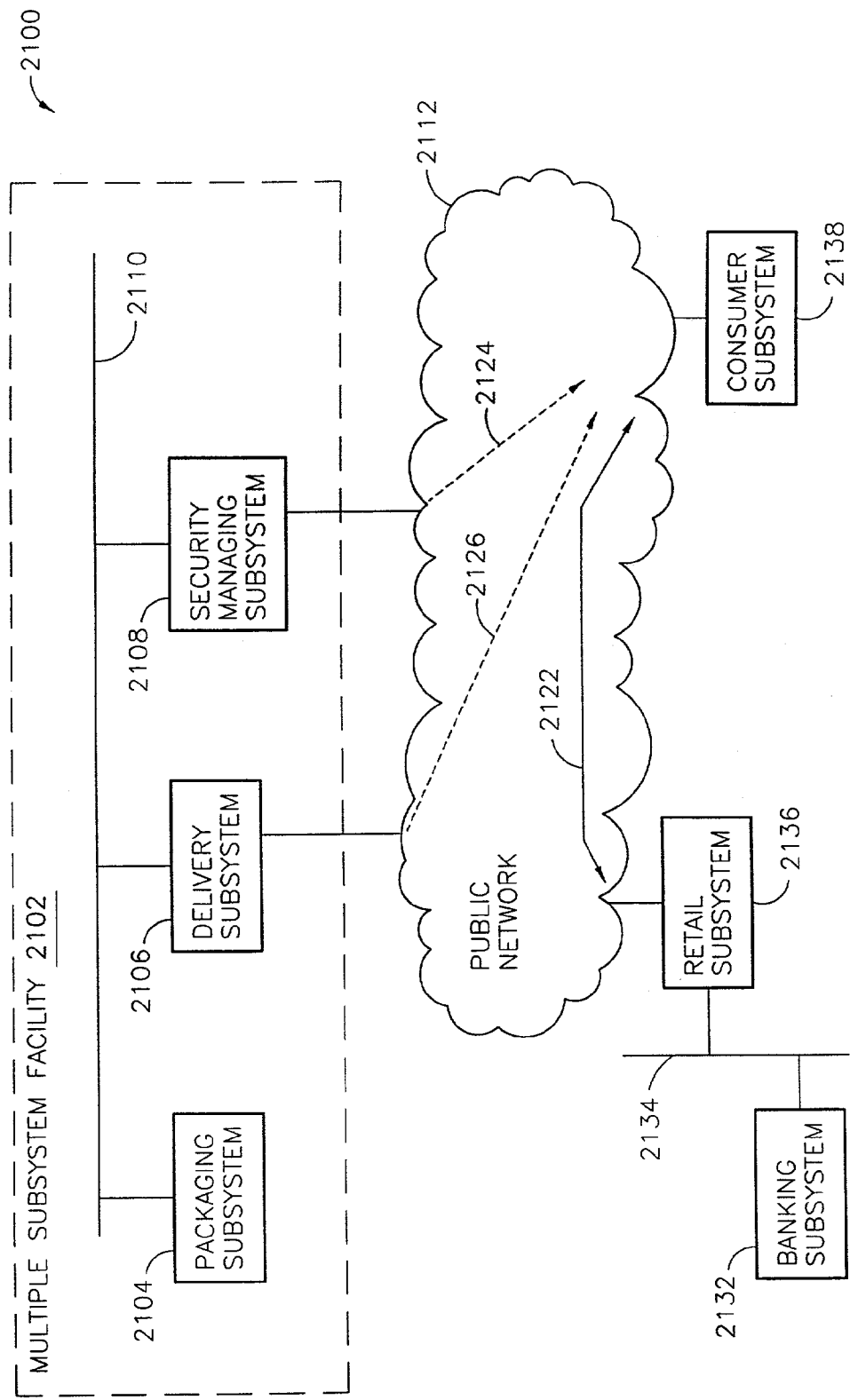
FIG. 21 is a functional block diagram of a system according to various aspects of the present invention.

A system for data transfer according to various aspects of the present invention may include a public network. Use of a public network (e.g., the Internet) simplifies data communication among any number of subsystems. For example, system 2100 of FIG. 21 includes multiple subsystem facility 2102, public network 2112, bank subsystem 2132, retail subsystem 2136, and consumer subsystem 2138. Banking subsystem 2136 and retail subsystem 2136 are coupled for data transfer by private network 2134. Multiple subsystem facility 2102 includes a private network 2110 coupled to each of packaging subsystem 2104, delivery subsystem 2106, and security managing subsystem 2108. Each subsystem may include one or more conventional computer systems (e.g., servers or workstations) having data stored therein.

Each illustrated subsystem performs a subset of the functions of system 2100. Additional subsystems may be added in alternate implementations; and, suitable combinations of functions may be performed on fewer physical subsystems without departing from data transfers of the type discussed above. For example, alternate implementations of system 2100 may include at each illustrated subsystem any number of subsystems of the same functional type operating in parallel (e.g., for redundancy) or at the same or different locations (e.g., for added capacity or for specialization). Alternate implementations may include different subsystems in a multiple subsystem facility 2102 and include zero or any number of such facilities. In still another alternate implementation, retail subsystem 2136 is also coupled to private network 2110 and may be part of an expanded multiple subsystem facility.

System 2100 facilitates delivery of data products (e.g., digital works) to consumer subsystem 2138 while maintaining security of data stored on various other subsystems including delivery subsystem 2106 and security managing subsystem 2108. For example, consumer subsystem 2138 may order products via a data transfer 2122 to retail subsystem 2136. Retail subsystem 2136 may communicate with banking subsystem 2132 to assure payment for ordered products. Security managing subsystem 2108 may convey a permit to consumer subsystem 2138 to regulate access to products by consumer subsystem 2138. And, products prepared for delivery by packaging subsystem 2104 may be delivered by delivery subsystem 2106 to consumer subsystem 2138 as permitted by the permit.

Without interfering substantially with the commercial value of the operations of system 2100 as discussed above, the data maintained by the various subsystems of system 2100 is made secure as discussed above by virtue of the combination of several aspects of system organization and operation. For example, data on other subsystems is made secure from processes on consumer subsystem 2138 in several ways including: (1) transactions 2122 with retail subsystem 2136 do not convey information leading to the identification of multiple subsystem facility 2102, its subsystems, or banking subsystem 2132; (2) there is no interface between consumer subsystem 2138 and banking subsystem 2132; (3) there is no interface between consumer subsystem 2138 and packaging subsystem 2104; (4) the permit is delivered via a protected transfer 2124; (5) the product is delivered via a protected transfer 2126; and (6) the permit does not include information sufficient for unlimited use of the product.

The functions discussed above with reference to system 2100 facilitate an implementation of computer network 100 as a particular application of system 2100. Though it is not necessary for each subsystem of system 2100 to be a node as discussed above or have a unique network address, subsystems in such an implementation may correspond to nodes as follows. Packaging subsystem 2104 may include content acquisition node 102, content managing node 104, and provider preparation node 106 including the processes and data storage functions discussed above with reference to these nodes. Delivery subsystem 2106 may include store 216, list 318, send process 322, and report process 334 as discussed above. Security managing subsystem 2108 may include authorizing node 112 and reconciling node 118 including the processes and data storage functions discussed above with reference to these nodes. Banking subsystem 2132 may include banking node 114 including the processes and data storage functions discussed above with reference to that node. Retail subsystem 2136 may include file 306, form request process 304 and event reporting node 116 and its processes and data storage functions. Consumer subsystem 2138 may include content requesting node 110 including the processes and data storage functions discussed above with reference to that node. System 2100 performs methods which may include some operations that parallel operations discussed above with reference to network 100.

Figure 22:
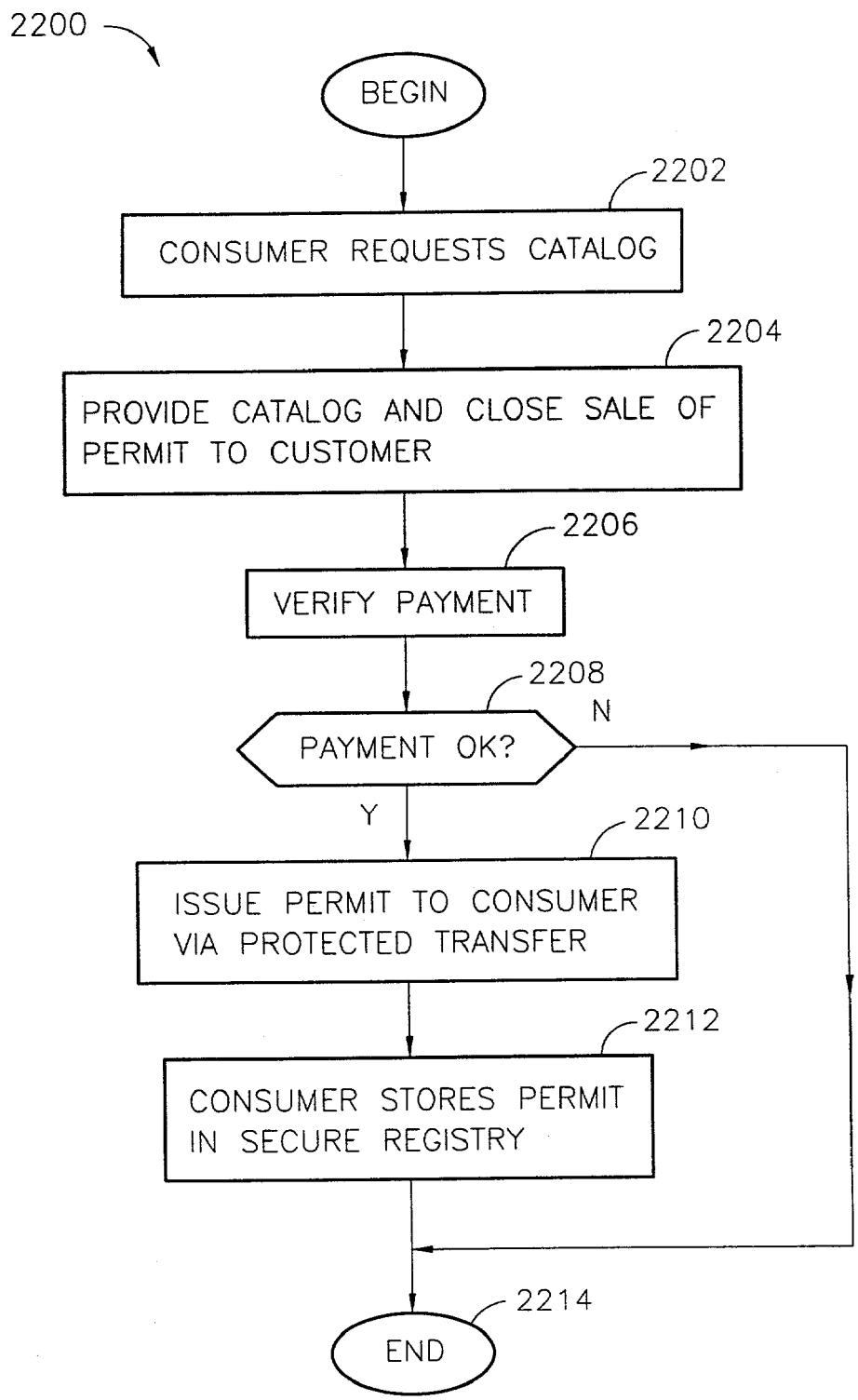
FIG. 22 is a functional flow diagram for a portion of a method of selling a permit.
Figure 23:
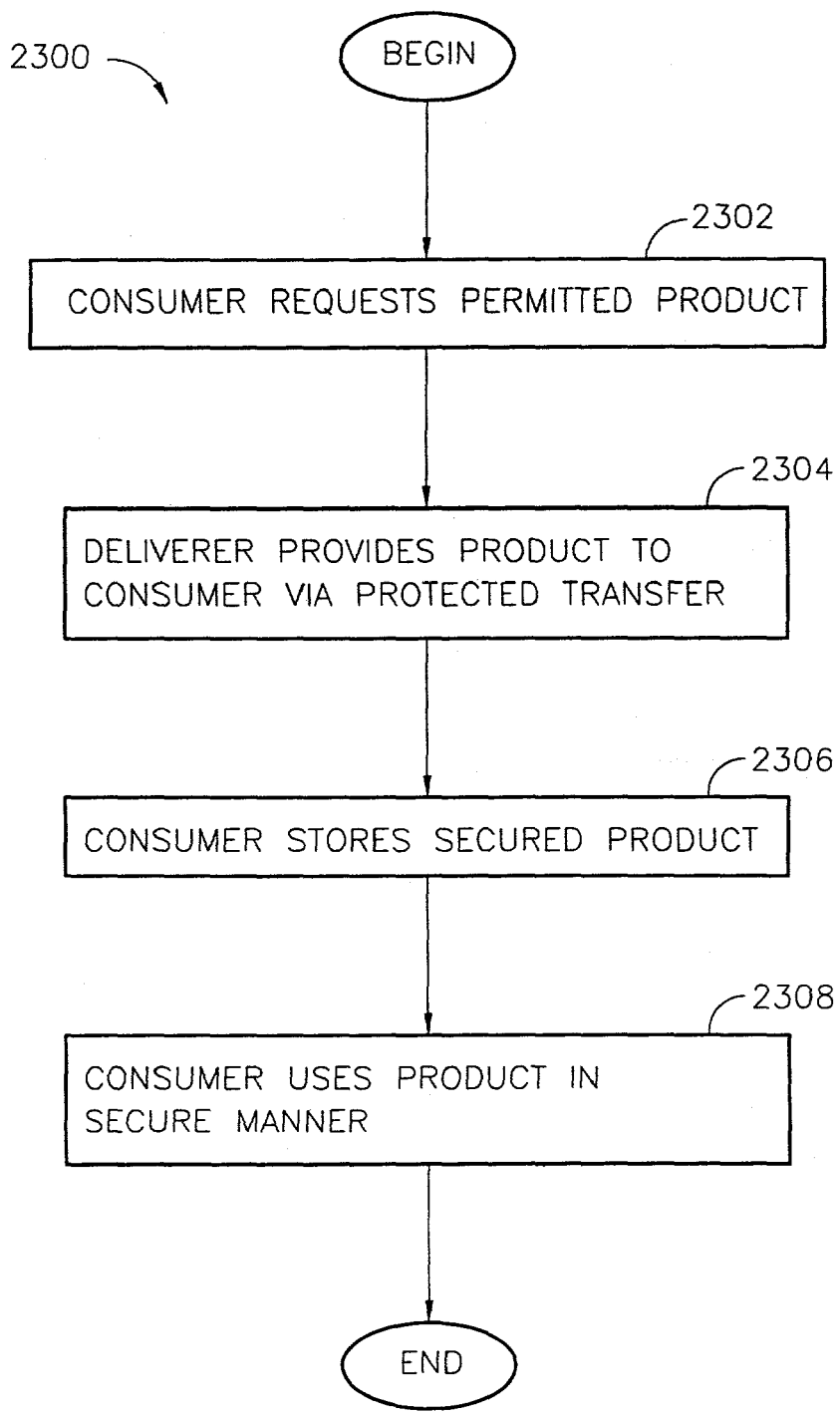
FIG. 23 is a functional flow diagram for a portion of a method of delivering a product.
Figure 24:
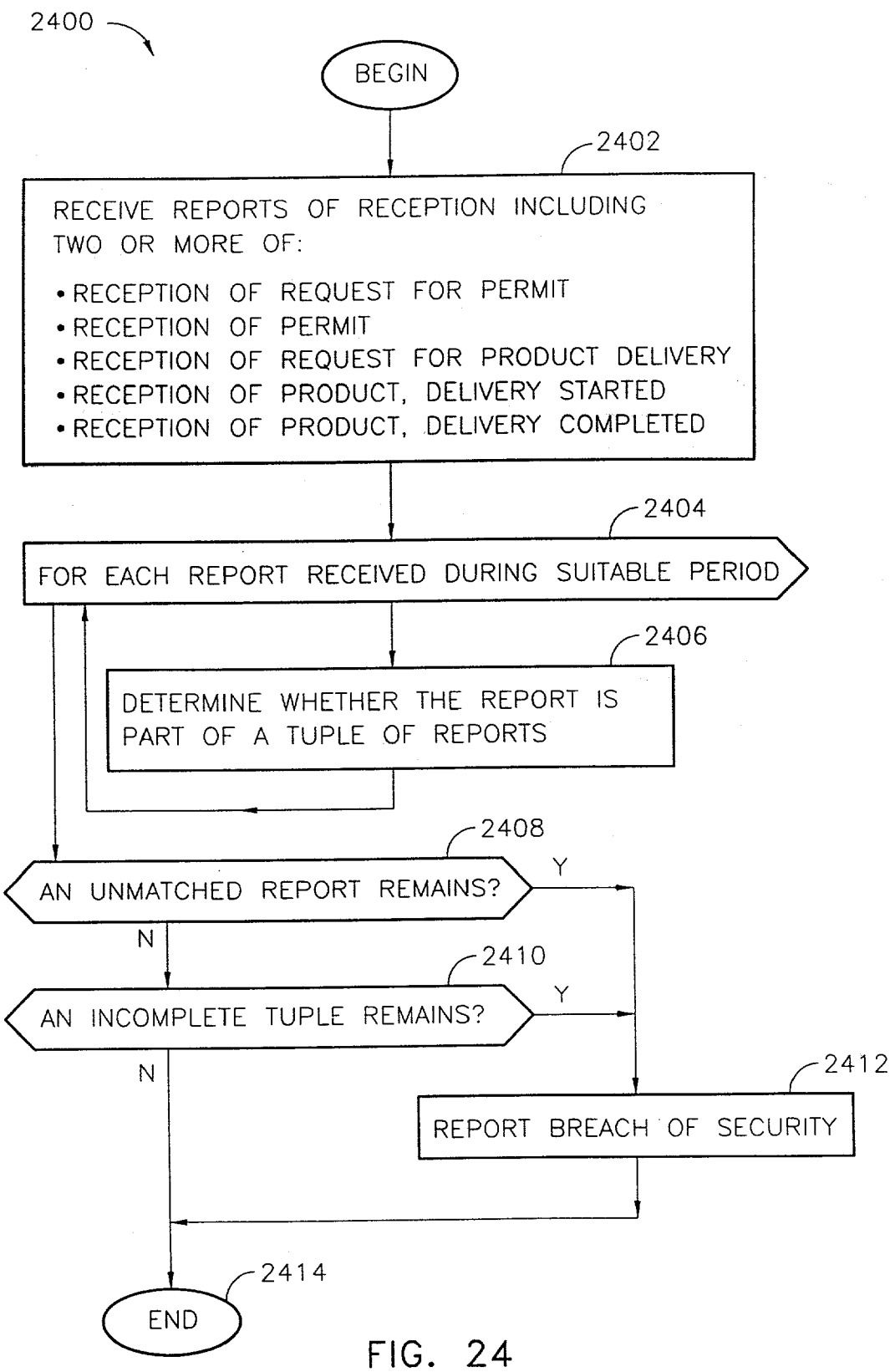
FIG. 24 is a functional flow diagram for a portion of a method of detecting a breach of security.
Figure 25A:
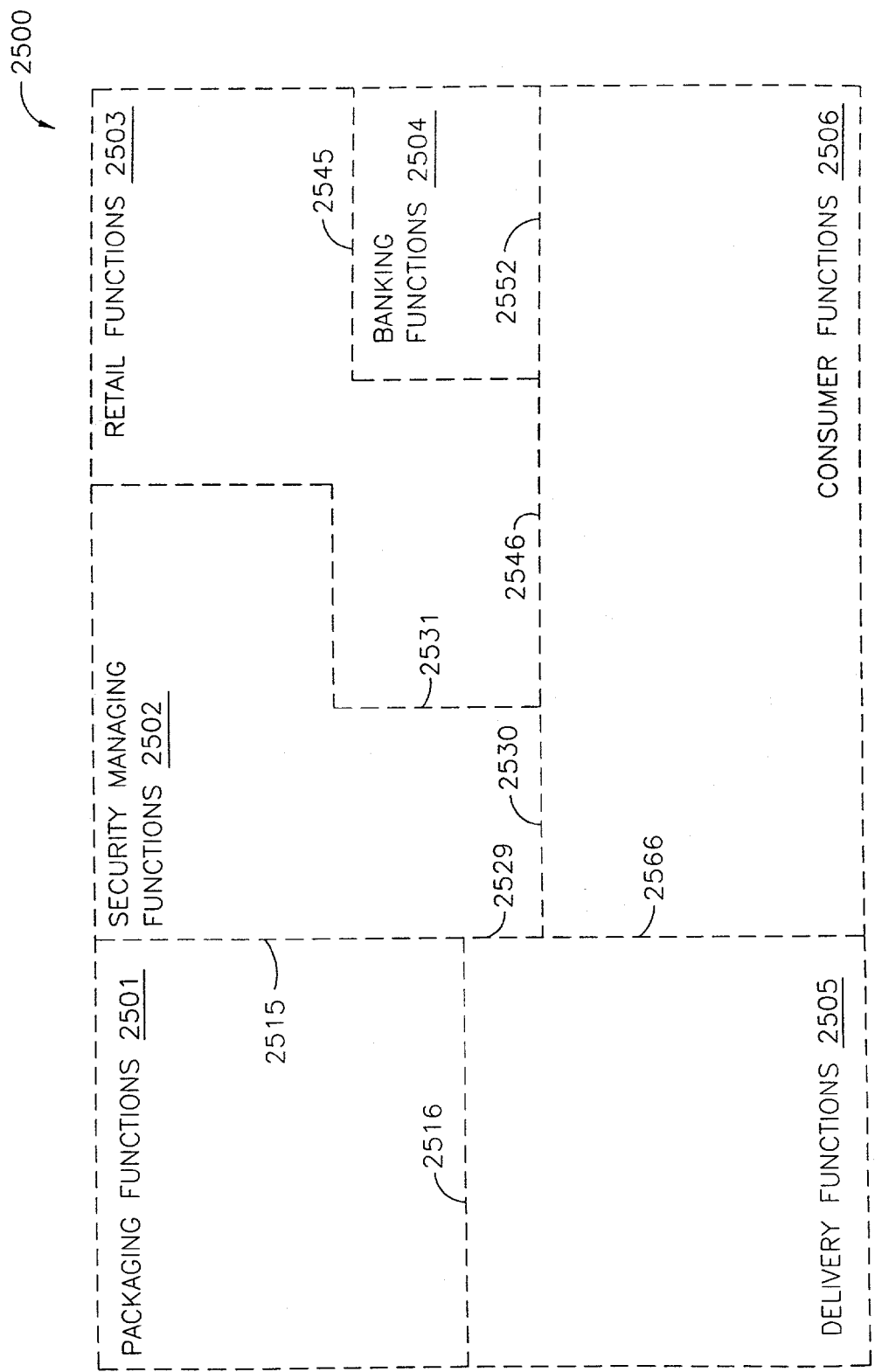
FIG. 25 is a functional block diagram including data flows describing an architecture according to various aspects of the present invention.
Figure 25B:
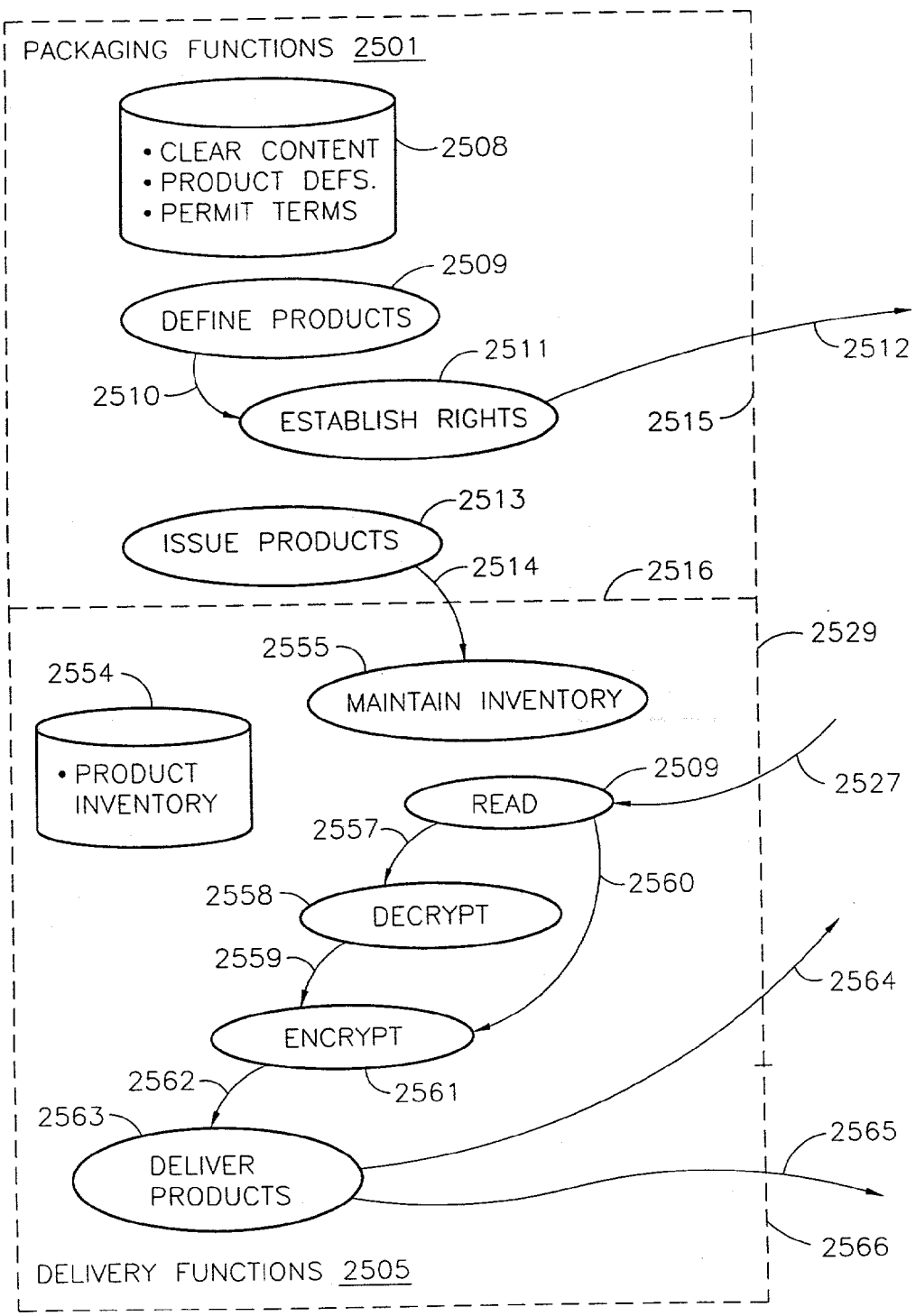
Figure 25C:
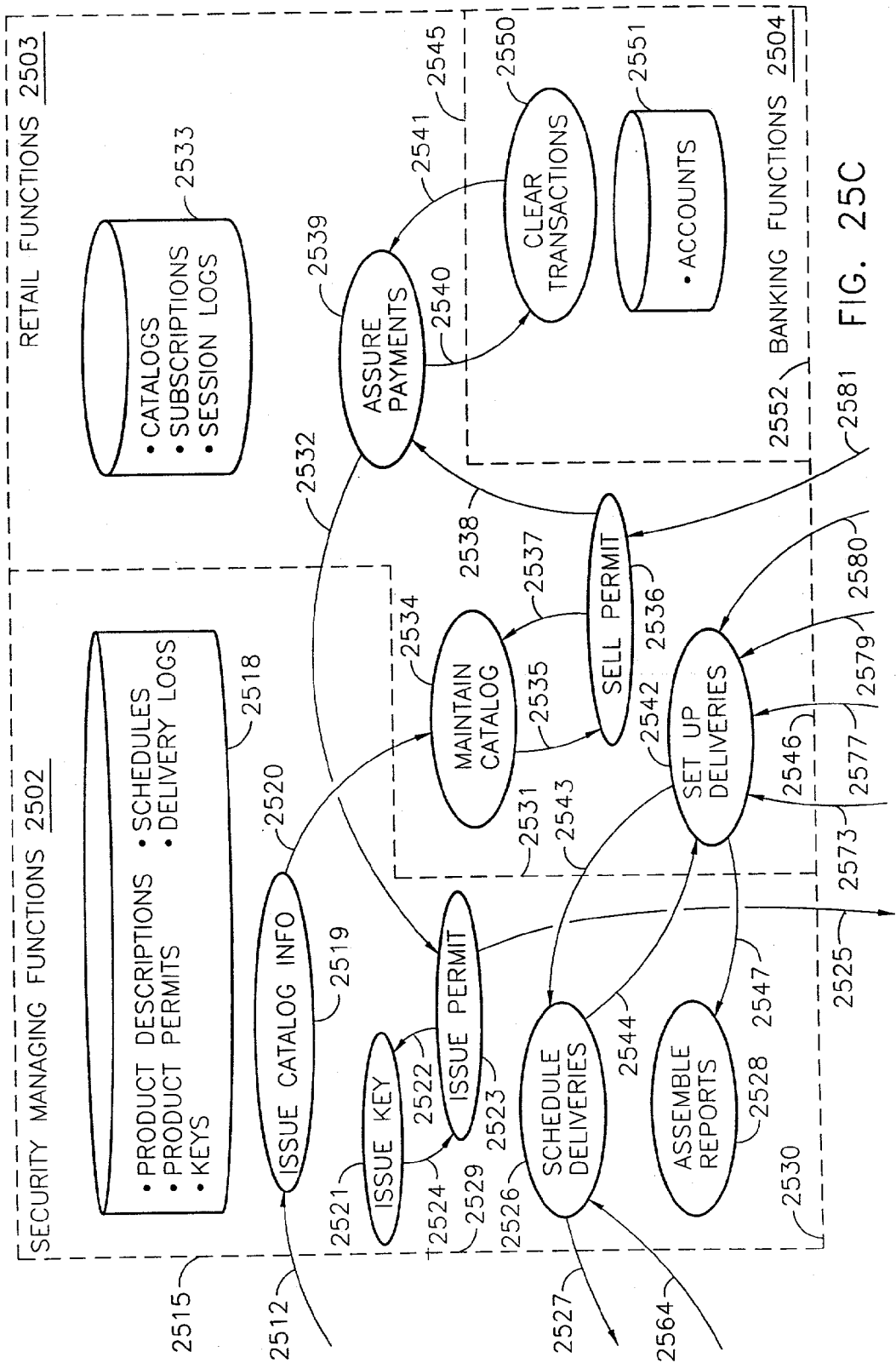
Figure 25D:
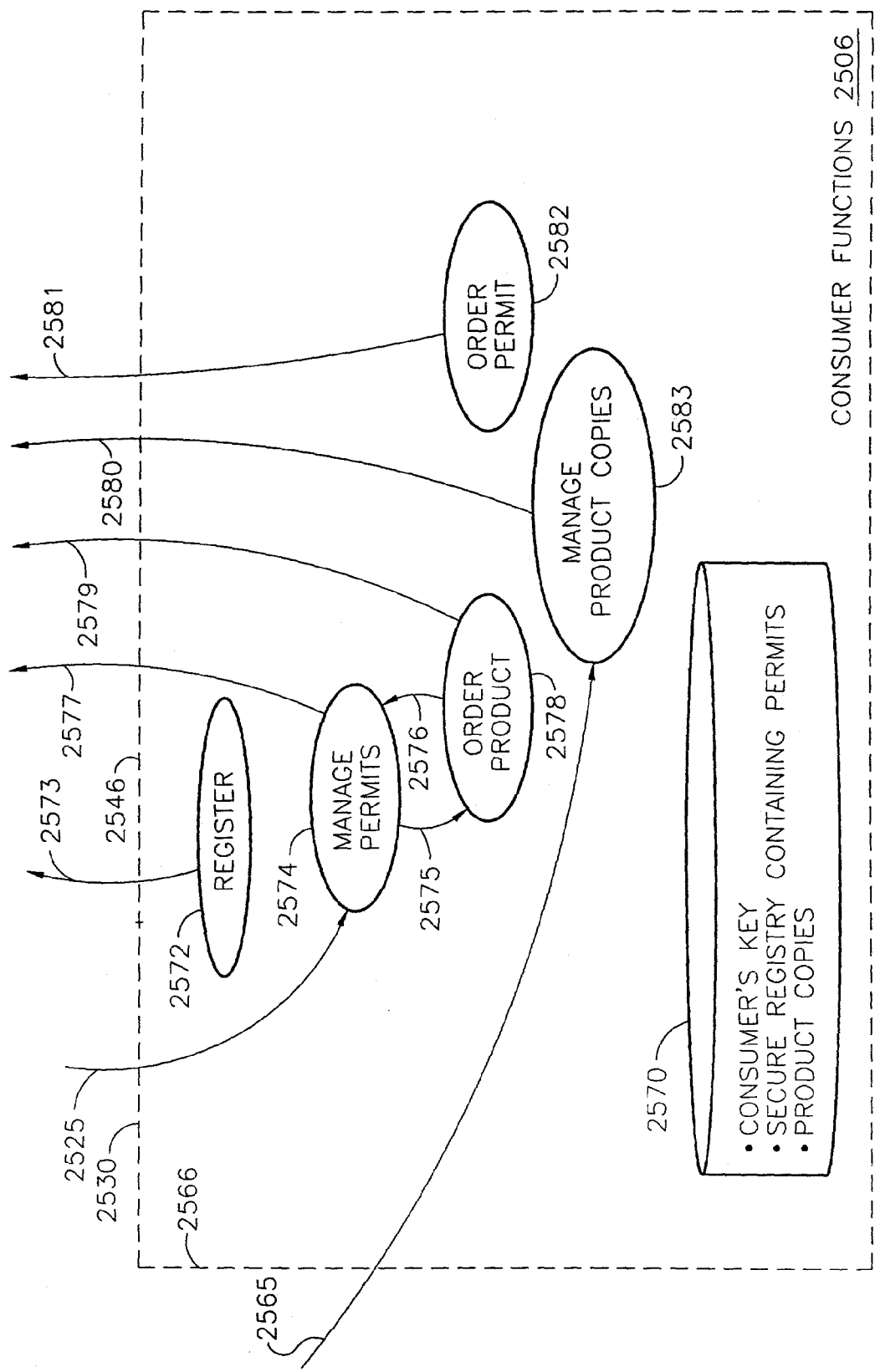

System 2100 performs a method including selling a permit (e.g., as in 2200 of FIG. 22), delivering a product (e.g., as in 2300 of FIG. 23), and detecting a breach of security (e.g., as in 2400 of FIG. 24). Each method includes an expression of a protocol for cooperation across various interfaces of system 2100. A method for selling a permit begins with a consumer requesting (2202) a catalog or otherwise indicating interest in a product in any conventional manner via cooperation of consumer subsystem 2138, data transfer 2122, and retail subsystem 2136. A catalog is provided (2204) and the sale of a permit to the customer is closed (2204) via cooperation of retail subsystem 2136, data transfer 2122, and consumer subsystem 2138 in any suitable conventional manner. Payment is verified to have been adequately assured in any suitable manner (e.g., by debit, credit, voucher, or gift certificate) by cooperation of retail subsystem 2136, private network 2134, and banking subsystem 2132. If payment is not adequately assured (2208) the method is terminated without delivery of a permit. Otherwise, a permit is issued (2210) to the consumer via a protected transfer via cooperation of security managing subsystem 2108, protected data transfer 2124, and consumer subsystem 2138. In response to receipt of the permit, the consumer stores (2212) the permit in any suitable manner, storing being performed by consumer subsystem 2138. For example, the permit may be stored in a secure registry via consumer subsystem 2138. The permit may be transferred in encrypted form. The permit in either encrypted form or clear form may be encrypted before storage.

A method for delivering a product begins with the consumer requesting (2302) a permitted product via cooperation of consumer subsystem 2138, data transfer 2122, and retail subsystem 2136. Delivery subsystem 2106 may become aware that delivery has been requested in any conventional manner (e.g., notice from retail subsystem 2136 to delivery subsystem 2106, polling by delivery subsystem 2106, or as a result of batch processing). The deliverer provides (2304) the requested product to the consumer via a protected transfer via cooperation of delivery subsystem 2106, protected transfer 2126, and consumer subsystem 2138. In response to receipt of the product, the consumer stores (2306) the product, storing being performed by consumer subsystem 2138. The product is preferably transferred in a secured form (e.g., scrambled, encrypted, or streamed). The product may be stored in a secure registry. At any time permitted thereafter, the consumer may use (2308) the product in a secure manner. Use being accomplished at least via consumer subsystem 2138. Use may entail further delivery (e.g., repeating operations discussed above with reference to 2304 and 2306). After use, the produce may again be stored (2306). Accounting for use may be accomplished in any suitable manner before, during, or after use.

A method for detecting breach of security begins by receiving reports of the reception of data of various types. At least two types of reception reports are received. According to various aspects of the present invention, any combination of two or more of the following reports may be received for each commercial activity involving any consumer. Reports may be received directly from the subsystem that received the data; or, received after being passed through or accumulated in any subsystem. Preferably, reporting does not create the need for any interface not already part of the permit and product delivery methods discussed above. The following types of reports may be received: (a) reception of request for a permit (2204) as received by retail subsystem

2136; (b) reception of a permit (2212) as reported to retail consumer subsystem 2138; (c) reception of a request for a product to be delivered (2302) as received by retail subsystem 2136; (d) reception of notice that delivery of a product has started (2304) as reported to retail subsystem 2136; or (e) reception of notice that delivery of a product has completed (2304) as reported to retail subsystem 2136. For each report received during a suitable period of time (2404), it is determined (2406) whether the report is part of a tuple (e.g., an association) of reports. This analysis of reports may be accomplished fully or in part in the retail subsystem so as to assure that consumer complaints regarding data transfers can be easily diagnosed; and/or may be accomplished fully or in part in the security managing subsystem 2108 to assure that violations of permitted deliveries and uses can be easily investigated. If an unmatched report remains (2408) after analysis (2404), or if an incomplete tuple remains (2410) after analysis (2404), a breach of security may be noted or reported (2412) in any conventional manner.

As discussed above, the functions of various subsystems of system 2100 may be performed in combination. Functional groupings of functions are preferred for scaling the responsiveness (e.g., avoiding network and computational delays) and scaling the data storage capacities (e.g., physical locations of storage devices) of system 2100. Nevertheless, interfaces between processes that perform particular functions may be omitted if no protected transfer crosses the interface.

A system architecture is a plan by which system functions are made the responsibility of particular processes for, inter alia, efficient performance of system functions and for efficient communication among processes. The system architecture is systematically applied as implementations of the system are developed and expanded. For example, system architecture 2500 of FIG. 25, includes packaging functions 2501, security managing functions 2502, retail functions 2503, banking functions 2504, delivery functions 2505, and consumer functions 2506. Data transferred between packaging functions 2501 and security managing functions 2502 crosses interface 2515. Data transferred between packaging functions 2501 and delivery functions 2505 crosses interface 2516. Data transferred between security managing functions 2502 and retail functions 2503 crosses interface 2531. Data transferred between security managing functions 2502 and consumer functions 2506 crosses interface 2530. Data transferred between security managing functions 2502 and delivery functions 2505 crosses interface 2529. Data transferred between retail functions 2503 and banking functions 2504 crosses interface 2545. Data transferred between retail functions 2503 and consumer functions 2506 crosses interface 2546. Data transferred between consumer functions 2506 and delivery functions 2505 crosses interface 2566.

Where no data transfers cross an interface between two groups of functions, the interface may be implemented by hosting the two groups on separate servers or hosting on an operating system that does not permit communication between processes to exist or go unnoticed.

Any conventional protocol may be used when implementing an interface with ports as discussed above. Ports are omitted from FIG. 25 for clarity but would suitably be employed to govern any data transfer paths or interfaces discussed above. The number of ports to be included in an implementation according to system architecture 2500 may be reduced from that implied by the functional groups illustrated in FIG. 25, for example, by hosting any convenient aggregation of functions on a common host where an interface between functions need not be erected. For instance, if functions of packaging subsystem 2104 and delivery subsystem 2106 were to be hosted on one server, interface 2516 may be omitted, a common port supporting a network protocol for private network 2110 may be used for data transfers across interfaces 2515 and 2529; nevertheless, a separate port is recommended for protected data transfer 2565 (implementing 2126) across interface 2566. Security managing functions 2502 may be hosted with other functions, nevertheless, a separate port is recommended for protected data transfer 2525 (implementing 2124) across interface 2530.

Processes described with reference to FIG. 25 may be implemented in any conventional computer technology including multitasking environments wherein processes produce outputs whenever sufficient inputs are received. Interprocess communication may include remote procedure call, polling, interruption, or other process or thread scheduling techniques. Data may be stored using any conventional technology including, for example, hierarchical or relational database, document object models, or markup languages (e.g., XML).

Packaging functions 2501 include define products process 2509, establish rights process 2511, and issue products process 2513. Data related to these functions is stored in store 2508 including content in clear form, product definitions, and permit terms. Store 2508 includes data (also called content) for products. Data may be stored in unencrypted (clear) format. A product is data in any form. A product may include content from any conventional sources and combined in any conventional manner. Examples of products include a computer program executable file, a database, printed music with text, a novel with graphic art, a newspaper subscription, digitized audio of a song as performed, an animated cartoon with audio and video, a movie with commercial intermissions and subtitles, a stream of raw or analyzed data derived from telemetric instrumentation in real time, an interactive tutorial for distance learning. Some of these products are delivered as a unit in total before use. Others are delivered in streaming format to be used while being delivered.

Define products process 2509, with operator input, defines a product by identifying files of store 2508 that are desired to constitute a product; assigning a product identifier; and storing the foregoing information indexed by product identifier in store 2508 as product definitions (e.g., primary master copies). With operator input and In response to receipt of particular product identifiers 2510 from define products process 2509, establish rights process 2511 defines any conventional rights for use and/or disposition of the product(s). Rights including pricing and distribution controls may be defined as rules in any suitable rights grammar, preferably an industry standard rights expression language. Rights for particular products may be stored as permit terms indexed by product identifier in store 2508. Rights and product definitions (e.g., including title, author, description) are conveyed 2512 by data transfer across interface 2515 to issue catalog information process 2519.

Architecture 2500 supports the delivery of products to numerous sites having delivery functions from numerous sites having packaging functions. Operator input to issue products process 2513 may define a particular delivery site to which products (e.g., secondary master copies of products) are to be issued. Issue products process 2513 may encrypt or scramble content conveying the issued products in any suitable conventional manner before transferring corresponding data across interface 2516. The form chosen typically is such that can be decrypted by decrypt process 2558. Keys used for encryption may be unique to each delivery site or type of product or both. Keys may be issued by process 2521 and stored in store 2518 in any conventional manner. After packaging, the formulation of a product as a series of files stored in clear content in store 2508 may bear no apparent resemblance to the issued package (e.g., delivered as a database having different file organization).

Security managing functions include issue catalog information process 2519, issue key process 2521, issue permit process 2523, schedule deliveries process 2526, and assemble reports process 2528. Data related to these functions is stored in store 2518, including product descriptions, product permits, keys, schedules, and delivery logs. Delivery logs include logs of the delivery of software (e.g., programs issued to consumer subsystems for maintaining security of deliveries), logs of the delivery of licenses, and logs of the delivery of products. Logs are indexed in any convenient manner for access by processes 2519–2528 and for ascertaining security breaches.

Architecture 2500 supports the dissemination of product information (e.g., title, description, price, usage terms, product identifier) to numerous sites having retailing functions from numerous sites having security managing functions. Issue catalog information process 2519 disseminates data received (2512) from time to time from packaging functions. Information for keeping a retailer's catalog up to date is dispensed by data transfer 2520 to the retail site identified as specified by operator input or in schedules stored in store 2518. Information may be transferred across interface 2531 in any suitable form including encrypted form particular to a retail site (e.g., when information is considered competition sensitive).

In response to receipt of authorization to issue a permit (2532), issue permit process 2523 requests (2522) and obtains (2524) one or more keys from issue key process 2521. One or more keys are used to encrypt usage terms, product identifiers, and other fields of a permit prior to transfer to a consumer. Additional and preferably different keys are used to encrypt product for transfers such as 2514 and 2565. Data (e.g., a permit) encrypted with a first key may be encrypted with a second key preferably different from the first key.

In response to receipt of a request 2543 made by set up deliveries process 2542, schedule deliveries process 2526 determines a suitable date and time to initiate delivery of the requested product. Scheduling may give priority to predetermined types of requests, products, consumers, usage terms, and network load. Schedule deliveries process 2526 may maintain queues for each priority and arbitrate among queues to select a queue to draw from to provide a request 2527 to deliver product to delivery functions 2505. Request 2527 crosses interface 2529 and may be subject to passing through ports at the interface for improved security.

When a request 2527 has been made, schedule deliveries process 2526 reports status 2544 to set up deliveries process 2542. In response to receipt of reports (e.g., start of delivery, end of delivery, interruption of delivery) from deliver products process 2563, schedule deliveries process 2526 may report the same (2544) to set up deliveries process 2542.

Periodically, set up deliveries process 2542 may provide reports 2547 in raw or in tuple form to assemble reports process 2528. Assemble reports process 2528 may analyze these reports for any implied breach of usage rights and report results to an operator. Assemble reports process 2528 maintains delivery logs in store 2518 and responds to operator input for the presentation of summary or analysis based on queries of delivery logs using any conventional data base analytical and presentation techniques. In an alternate implementation, assemble reports process 2528 may direct banking functions to make royalty payments for delivery and use of the works processed as various products over a suitable period of time.

Retail functions include maintain catalog process 2534, sell permit process 2536, assure payment process 2539, and set up deliveries process 2542. Data related to these functions is stored in store 2518, including catalogs, subscriptions to products (e.g., newspapers) that become available periodically, and session logs.

Maintain catalog process 2534 receives updates 2520 and maintains current catalog information in store 2533 (e.g., including numerous catalogs for different types of consumer requests). Catalog information is sufficient to close a sale for a permit according to any form usage rights that are priced in the catalog. If a user desires usage rights or products other than what appears as a line item in the catalog, the request may be logged for batch consideration by an operator of a packaging or security managing subsystem, referred to an operator for customer support (e.g., to persuade the consumer to buy what is offered or a substitute), or ignored.

Sell permit process 2536 receives a request to purchase a permit from order permit process 2582 and, in response, requests (2537) and receives (2535) catalog information requisite for completing sales of the requested and possibly related permits. The sale may include return of a permit (2581) for credit or for replacement with any other permit (e.g., expanding or contracting usage rights for the same or different products). On providing the consumer with a purchase confirmation request, sell permit may receive purchase confirmation and proceed with collecting payment.

Assure payment process 2539 receives from sell permit process 2536 authorization (2538) to prepare a financial transaction that resulted from sales activity (e.g., buy or refund). Assure payment process 2539 presents one or more financial transactions 2540 (e.g., debit, credit, transfer) to clear transactions process 2550 and receives confirmation 2541 that an account was successfully adjusted. In response to receiving such confirmation, assure payment process 2539 notifies (2532) issue permit process 2523 to issue a permit as discussed above. Without confirmation from clear transactions process 2550, no permit will issue because no request to issue a permit 2532 will be transferred across interface 2531.

Set up deliveries process 2542 receives requests for deliveries of permits and products. In response to receipt of a request for operating software from register process 2572, set up deliveries process 2542 notifies schedule deliveries process 2526 to initiate the requested delivery. Operating software may be requested and delivered using the same request and delivery paths as discussed herein for a product. Specifically, delivery of software may include a protected transfer 2565 as discussed above. In response to receipt of a request 2581 from order product process 2578 to have a product delivered, set up deliveries process 2542 notifies schedule deliveries process 2526 to initiate the requested delivery.

Set up deliveries process 2542 receives various reports (2577, 2580, 2544) as described above with reference to method 2400. Set up deliveries process may perform any method (e.g., 2400) to ascertain and report to security managing functions 2502 indications of proper and improper deliveries. Information concerning proper deliveries may be reported to an operator or a conventional retailing process for developing leads, developing consumer demand, or promoting products.

Banking functions include clear transactions process 2550. Account balances and transaction logs are kept in data store 2551. Banking functions may be accomplished by any conventional network of financial clearing houses. Account information may be distributed among a variety of commercial banking institutions, each providing a portion of the banking functions as shown.

Delivery functions include maintain inventory process 2555, read process 2556, decrypt process 2558, encrypt process 2561, and deliver products process 2563. Data related to these functions is stored in store 2554, including products in encrypted form, indexed by product identifier. Maintain inventory process receives products issued to it by packaging functions, namely issue products process 2513. Products may be stored in store 2554 in any suitable conventional manner for security, ease access and maintenance.

In response to receiving a request 2527 for delivering a product, read process 2556 accesses product inventory on store 2554 to obtain the product to support the requested delivery mode (e.g., download in total, stream at a specified data rate, or broadcast or multicast to multiple consumers). Read process then enqueues the product (or portions) 2557 for access by decrypt process 2558 so that encryption and security functions effected by issue products process 2513 may be removed. Read process provides keys supplied in the request 2527 to decrypt and encrypt processes 2558 and 2561. Clear content 2539 is provided by decrypt process 2558 to encrypt process 2561. Encrypt process 2561 encrypts clear content 2539 to provide encrypted content 2562. Deliver products process 2563 receives encrypted content 2562 and, via a protected transfer, provides it to manage product copies process 2583. On start and on completion of delivery, deliver products process 2563 may provide reports 2564 to schedule deliveries process 2526. Deliver products process may also report receipt of a request to deliver a product 2527. Deliver products process may include a port for any conventional communication protocol including wired and wireless protocols.

Consumer functions include register process 2572, manage licenses process 2574, order product process 2578, manage product copies 2583, and order permit process 2582. Data related to these functions is stored in store 2570 including a consumer's key and a secure registry. A consumer's key may be a simple symmetric key or may be a public key of a public/private dual key system issued by issue key process 2521. The secure registry includes information necessary to order permits, order content, and use content that has been delivered to the consumer.

A computer (e.g., a personal computer, personal digital assistant, wireless device, telephone, laptop, or workstation) after installation and configuration of software to perform the functions described herein may operate with system 2500 as a consumer substation. Such software may include a suitable operating system (e.g., to assure security functions are not breached); access software for connection and browsing a public network (e.g., a conventional web browser of the type used for browsing and shopping via the Internet); software to establish a secure container, a secure registry, and a secure manager to be used for all access to the registry and container; special purpose software for using the products delivered (e.g., a word processor for using text based products, a media player for using audio and video products, inline decryption/encryption software for using products in an encrypted form); a key stored in the registry or secure container used, for example, for making requests of other functions of system 2500; tamper resistance software to make difficult the unauthorized analysis and modification of the installed configuration; and, tamper evidencing software that detects and reports attempts at analysis or modification (e.g., substitution) of components of the installed configuration including the secure container, secure registry, permits, and products. Such software may cooperate with hardware (e.g., circuit assemblies, smart cards, or read only media) that form part of the installed configuration. Such software and hardware performs suitable conventional functions except as described herein in cooperation with consumer functions 2506.

The following processes may be implemented to cooperate with a browser, simplifying shopping and using products by providing the user with a uniform interface that hides the details of the communication methods discussed above.

Automatically on lapse of a timer or on user input, register process 2572 makes requests for adding to and updating the software configuration of a consumer subsystem. Register process 2572 provides a request 2573 to set up deliveries process to initiate such delivery or update of software as discussed above.

In response to user input, order permit process 2582 makes a request 2581 for purchasing a permit. The request may be the result of shopping or may initiate shopping by the consumer. Shopping includes presentation of catalog descriptions in response to any conventional queries specified by the user of the consumer substation. Such a request initiates the sale for issuance of a permit as discussed above. By providing the permit via a protected transfer, a security attack by the user is likely to be ineffective because the user is not provided with information sufficient to search for additional information that may aid the security attack.

Manage permits process 2574 receives a permit via a protected transfer 2525 and reports such receipt (2573) to set up deliveries process 2542.

In response to user input, order product process 2578 requests (2576) and obtains (2575) usage rights and product identification from manage permits process 2574 representing results of a query on current permitted products that have not been delivered. A request for product delivery (2579) preferably includes a copy of the permit granting the right to receive the product. Forwarding the permit through retail functions 2503, then through security managing functions 2502, to be acted upon by delivery functions 2505 may be accomplished using any conventional indirect addressing technology including indirection provided under Internet Protocols (e.g., HTTP) or conventional firewall design.

Table 1 describes fields as used in the data structures illustrated in FIG. 26. Data structures of FIG. 26 may be represented in memory or in messages using any conventional technology. Each data structure implements associations (e.g., each combination being a tuple) among the indicia of functional values described in the Table.

TABLE 1

| Field | Description |
| --- | --- |
| consumer transaction identifier | An identifier assigned by the consumer functions. May be a combination of host identifier, date, and time. |
| consumer node address | A network address (e.g., a world wide port name, or Internet Protocol address) |

TABLE 1-continued

| Field | Description |
|---|---|
| consumer host identifier | An identifier designed to be unique to each consumer substation. May be based on serial numbers associated with products that make up the hardware and software configuration of the workstation and its peripherals used to form the consumer workstation. |
| consumer public key | A key used, for example, to encrypt delivery of a permit. |
| product identifier | An identifier assigned by the packaging functions. Similar in function to an international standard book number (ISBN). |
| delivery date and time | A date and time when a delivery is expected to be made. Used for scheduling deliveries. |
| product usage rights | Usage rights in a conventional grammar. Dates and times may be specified in usage rights. The delivery date and time discussed above must fall within the usage rights. |
| permit product key | A key used, for example, to encrypt product permitted to be delivered under this permit. |
| permit seal | An authentication symbol (e.g., a character string of any suitable complexity) used to erect another barrier to attacking the security of the communication. May be a checksum based on the contents (hash) of the permit. |
| request3 consumer date time | A time when the request3 was made. |
| packaging decryption key | This key is used by packaging functions to encrypt products; and by decrypt process 2558. May be unique to each delivery subsystem. |
| delivery encryption key | This key is used by encrypt process 2561. May be unique for each permit, each product, each consumer transaction, or a combination of these. Multiple keys may be used in series on the product for each of these identifiers. |

The present invention has been described in the preferred embodiments. Several variations and modification shave also been described and suggested. Other embodiments, variations, and modifications known to those skilled in the art may be implemented without departing from the scope and spirit of the invention as recited in the claims below.

The invention claimed is:

1. A method comprising:
   receiving a request for a product from a requesting node, the request received by a providing node;
   providing the request from the providing node to an authorizing node;
   receiving a permit from the authorizing node in response to the request, conveying a first electronic digital data in a first protected transfer to deliver the permit to the requesting node;
   conveying a second electronic digital data in a second protected transfer to deliver a product to the requesting node identified by the permit;
   preventing the requesting node from identifying the authorizing node;
   receiving at least two reports from a plurality of reports during a time period wherein the plurality of reports include a permit request report, a permit delivery report, a product delivery request report, a product delivery commencement report, and a product delivery completion report;
   grouping reports into tuples of related reports;
   determining whether a particular report is unmatched;
   determining whether a particular tuple is incomplete; and
   providing notice of a breach of security in accordance with at least one of whether the particular report is unmatched and whether the particular tuple is incomplete.

2. The method of claim 1 wherein the requesting node and the providing node communicate via a public network without a firewall between the providing node and the public network.

3. The method of claim 1 wherein
   a first delivering system conveys the permit responsive to a public network link to the requesting node; and
   a second delivering system conveys the product responsive to a public network link to the requesting node.

4. The method of claim 1 wherein a portion of the permit is encrypted.

5. The method of claim 1 wherein the request for the product comprises at least a portion of the permit.

6. The method of claim 1 wherein each request is received via a public network link.

7. The method of claim 1 wherein the product comprises at least one of a digital work, a file, an audio recording, a video recording, an executable program, a document, a multimedia program, and content.

8. The method of claim 1 wherein conveying the second digital data comprises or downloading the product in entirety.

9. The method of claim 1 wherein conveying the second digital data comprises streaming the product.

10. The method of claim 1 wherein conveying the first digital data comprises:
    detecting a prerequisite event, the event being at least one of receiving a notice that payment for the permit has been assured by a provided process; and
    conveying third electronic digital data across an interface and from a port in accordance with a protocol that denies entry into a state for transferring the permit unless the event is detected.

11. The method of claim 1 wherein conveying the second digital data comprises:
    detecting a prerequisite event, the event being at least one of receiving a notice, receiving at least a portion of the permit, receiving a key for encrypting the product, and determining a network address for delivering the product; and
    conveying third electronic digital data across an interface and from a port in accordance with a protocol that denies entry into a state for transferring the product unless the event is detected.

12. A system comprising:
    means for receiving a request for a product from a requesting node, the request received by a providing node;
    means for providing the request to an authorizing node;
    means for receiving a permit from the authorizing node in response to the request;
    means for conveying a first electronic digital data in a first protected transfer to deliver the permit to the requesting node;
    means for conveying a second electronic digital data in a second protected transfer to deliver a product to the requesting node identified by the permit;
    preventing the requesting node from identifying the authorizing node;
    second means for receiving at least two reports from a plurality of reports during a time period, wherein the plurality of reports include a permit request report, a permit delivery report, a product delivery request report, a product delivery commencement report, and a product delivery completion report;
    means for grouping reports into tuples of related reports;

means for determining whether a particular report is unmatched;

means for determining whether a particular tuple is incomplete; and means for providing notice of a breach of security in accordance with at least one of whether the particular report is unmatched and whether the particular tuple is incomplete.

13. The system of claim 12 wherein the requesting node and the providing node communicate via a public network without a firewall between the providing node and the public network.

14. The system of claim 12 wherein
a first means for delivering conveys the permit responsive to a public network link to the means for receiving; and
a second a means for delivering conveys the product responsive to a public network link to the means for receiving.

15. The system of claim 12 wherein a portion of the permit is encrypted.

16. The system of claim 12 wherein the request for the product comprises at least a portion of the permit.

17. The system of claim 12 wherein each respective request is received via a public network link.

18. The system of claim 12 wherein the product comprises at least one of a digital work, a file, an audio recording, a video recording, an executable program, a document, a multimedia program, and content.

19. The system of claim 12 wherein the means for conveying the second digital data comprises means for downloading the product in entirety.

20. The system of claim 12 wherein the means for conveying the second digital data comprises means for streaming the product.

21. The system of claim 12 wherein the means for conveying the first digital data comprises:
means for detecting a prerequisite event, the event being at least one of receiving a notice that payment for the permit has been assured by a provided process; and
means for conveying third electronic digital data across an interface and from a port in accordance with a protocol that denies entry into a state for transferring electronic digital data of the permit unless the event is detected.

22. The system of claim 12 wherein the means for conveying the second digital data comprises:
means for detecting a prerequisite event, the event being at least one of receiving a notice, receiving at least a portion of the permit, receiving a key for encrypting the product, and determining a network address for delivering the product; and
means for conveying third electronic digital data across an interface and from a port in accordance with a protocol that denies entry into a state for transferring electronic digital data of the product unless the event is detected.

23. A method for reducing risk of unauthorized access to an electronic digital data product, the method comprising:
receiving a request for a product from a requesting system, the request received by a delivery system;
providing the request to an authorizing node;
receiving a permit from the authorizing node in response to the request;
conveying a first electronic digital data in a first protected transfer to deliver the permit to the requesting node;
conveying a second electronic digital data in a second protected transfer to deliver a product to the requesting node identified by the permit;
preventing the requesting system from identifying the authorizing node;
receiving at least two reports from a plurality of reports during a time period, wherein the plurality of reports include a permit request report, a permit delivery report, a product delivery request report, a product delivery commencement report, and a product delivery completion report;
grouping reports into tuples of related reports;
determining whether a particular report is unmatched;
determining whether a particular tuple is incomplete; and
providing notice of a breach of security in accordance with at least one of whether the particular report is unmatched and whether the particular tuple is incomplete.

24. The method of claim 23 wherein
the delivery system conveys the permit responsive to a public network link to the receiving system;
a second delivering system conveys the product responsive to a public network link to the receiving system.

25. The method of claim 23 wherein a portion of the permit is encrypted.

26. The method of claim 23 wherein the request for the electronic digital data product comprises at least a portion of the permit.

27. The method of claim 23 wherein each request is received via a public network link.

28. The method of claim 23 wherein the product comprises at least one of a digital work, a file, an audio recording, a video recording, an executable program, a document, a multimedia program, and content.

29. The method of claim 23 wherein conveying the second digital data comprises downloading the product in entirety.

30. The method of claim 23 wherein conveying the second digital data comprises streaming the product.

31. The method of claim 23 wherein conveying the first digital data comprises:
detecting a prerequisite event, the event being at least one of receiving a notice that payment for the permit has been assured by a provided process; and
conveying electronic digital data across an interface and from a port in accordance with a protocol that denies entry into a state for transferring electronic digital data of the permit unless the event is detected.

32. The method of claim 23 wherein conveying the portion of the electronic digital data product comprises:
detecting a prerequisite event, the event being at least one of receiving a notice, receiving at least a portion of the permit, receiving a key for encrypting the product, and determining a network address for delivering the product; and
conveying electronic digital data across an interface and from a port in accordance with a protocol that denies entry into a state for transferring electronic digital data of the electronic digital data product unless the event is detected.

* * * * *